(12) United States Patent
Helmes et al.

(10) Patent No.: US 9,513,798 B2
(45) Date of Patent: Dec. 6, 2016

(54) INDIRECT MULTI-TOUCH INTERACTION

(75) Inventors: John Helmes, Cambridge (GB);
Nicolas Villar, Cambrdige (GB);
Hrvoje Benko, Seattle, WA (US);
Shahram Izadi, Cambridge (GB);
Daniel Rosenfeld, Seattle, WA (US);
Stephen Hodges, Cambridge (GB);
David Alexander Butler, Cambridge (GB); Xiang Cao, Cambridge (GB);
Richard Banks, Egham (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 821 days.

(21) Appl. No.: 12/571,649

(22) Filed: Oct. 1, 2009

(65) Prior Publication Data

US 2011/0080341 A1 Apr. 7, 2011

(51) Int. Cl.
*G06F 3/0488* (2013.01)
*G06F 3/0354* (2013.01)
*G06F 3/041* (2006.01)

(52) U.S. Cl.
CPC ....... *G06F 3/04883* (2013.01); *G06F 3/03543* (2013.01); *G06F 3/041* (2013.01);
(Continued)

(58) Field of Classification Search
CPC .................. G06F 3/03543; G06F 2203/04104; G06F 2203/04808
(Continued)

(56) References Cited

U.S. PATENT DOCUMENTS 4,568,182 A 2/1986 Modjallal
4,943,806 A 7/1990 Masters et al.
(Continued)

FOREIGN PATENT DOCUMENTS

WO WO2009006735 A1 1/2009

OTHER PUBLICATIONS

Balakrishnan, et al., "The PadMouse: Facilitating Selection and Spatial Positioning for the Non-Dominant Hand", retrieved on May 11, 2009 at <<http://www.dgp.toronto.edu/~ravin/papers/chi98_padmouse.pdf>>, Proceedings of 1998 ACM Conference on Human Factors in Computing Systems (CHI 1998), 1998, pp. 9-16.
(Continued)

*Primary Examiner* — Shaheda Abdin
(74) *Attorney, Agent, or Firm* — Tom Wong; Micky Minhas; Zete Law, P.L.L.C.

(57) ABSTRACT

Indirect multi-touch interaction is described. In an embodiment, a user interface is controlled using a cursor and a touch region comprising a representation of one or more digits of a user. The cursor and the touch region are moved together in the user interface in accordance with data received from a cursor control device, such that the relative location of the touch region and the cursor is maintained. The representations of the digits of the user are moved in the touch region in accordance with data describing movement of the user's digits. In another embodiment, a user interface is controlled in a first mode of operation using an aggregate cursor, and switched to a second mode of operation in which the aggregate cursor is divided into separate portions, each of which can be independently controlled by the user.

20 Claims, 19 Drawing Sheets

(52) U.S. Cl.
CPC ........... *G06F 2203/04104* (2013.01); *G06F 2203/04808* (2013.01)

(58) Field of Classification Search
USPC ......... 345/156, 157, 174, 173; 715/702, 800
See application file for complete search history.

(56) References Cited

U.S. PATENT DOCUMENTS

| | | | |
|---|---|---|---|
| 5,175,534 | A | 12/1992 | Thatcher |
| 5,313,229 | A | 5/1994 | Gilligan et al. |
| 5,612,689 | A | 3/1997 | Lee, Jr. |
| 5,767,842 | A | 6/1998 | Korth |
| 6,191,774 | B1 | 2/2001 | Schena et al. |
| 6,204,839 | B1 | 3/2001 | Mato, Jr. |
| 6,362,811 | B1 | 3/2002 | Edwards et al. |
| 6,570,557 | B1 | 5/2003 | Westerman et al. |
| 6,614,420 | B1 | 9/2003 | Han et al. |
| 6,690,352 | B2 | 2/2004 | Cheng et al. |
| 7,030,861 | B1 | 4/2006 | Westerman et al. |
| 7,358,956 | B2 | 4/2008 | Hinckley et al. |
| 8,144,123 | B2 * | 3/2012 | Denoue et al. ............. 345/157 |
| 2002/0118170 | A1 | 8/2002 | Iaria et al. |
| 2003/0076296 | A1 | 4/2003 | Kolybaba |
| 2003/0142077 | A1 * | 7/2003 | Lilenfeld .................... 345/163 |
| 2003/0184520 | A1 | 10/2003 | Wei |
| 2004/0001044 | A1 | 1/2004 | Luciani, Jr. et al. |
| 2004/0264851 | A1 | 12/2004 | Amiri |
| 2005/0179657 | A1 | 8/2005 | Russo et al. |
| 2006/0132440 | A1 | 6/2006 | Safai |
| 2006/0149550 | A1 | 7/2006 | Salminen |
| 2007/0139376 | A1 | 6/2007 | Giles |
| 2007/0236450 | A1 | 10/2007 | Colgate et al. |
| 2007/0247424 | A1 * | 10/2007 | Jacob ........................... 345/158 |
| 2007/0247435 | A1 * | 10/2007 | Benko et al. ................ 345/173 |
| 2008/0010616 | A1 | 1/2008 | Algreatly |
| 2008/0106523 | A1 | 5/2008 | Conrad |
| 2008/0211785 | A1 * | 9/2008 | Hotelling et al. ........... 345/173 |
| 2008/0259026 | A1 | 10/2008 | Zeldin et al. |
| 2009/0049388 | A1 | 2/2009 | Taib et al. |
| 2009/0095540 | A1 | 4/2009 | Zachut et al. |
| 2009/0213081 | A1 | 8/2009 | Case, Jr. |

OTHER PUBLICATIONS

Balakrishnan, et al., "The Rockin' Mouse: Integral 3D Manipulation on a Plane", Proceedings of the 1997 ACM Conference on Human Factors in Computing Systems (CHI 1997), 1997, pp. 311-318.
Benko, et al., "Precise Selection Techniques for Multi-Touch Screens", CHI 2006, ACM, Apr. 2006, pp. 1263-1272.
Benko, et al., "Sphere: Multi-Touch Interactions on a Spherical Display", UIST 2008, ACM, Oct. 2008, pp. 77-86.
Borghino, "Mouse 2.0: Microsoft's multi-touch mouse prototypes", retrieved on Oct. 13, 2009 at <<http://www.gizmag.com/microsoft-multi-touch-mouse-prototypes/13081/>>, Gizmag, Personal Computing, Oct. 10, 2009, pp. 1-4.
Butler, et al., "SideSight: Multi-"touch" interaction around small devices", UIST 2008, ACM, 2008, pp. 201-204.
Casiez, et al., "The DigiHaptic, a New Three Degrees of Freedom Multi-finger Haptic Device", retrieved on May 11, 2009 at <<http://www2.lifl.fr/~casiez/publications/vric03-casiez.pdf>>, 5 pages.
Cechanowicz, et al., "Augmenting the Mouse With Pressure Sensitive Input", Proceedings of SIGCHI 2007, ACM, 2007, pp. 1385-1394.
Dannenberg, et al., "A Gesture Based User Interface Prototyping System", retrieved on May 11, 2009 at <<http://www.cs.cmu.edu/afs/cs.cmu.edu/user/rbd/www/papers/Scanned%20Papers/gesture_based_user044.pdf>>, ACM, 1989, pp. 127-132.
Dietz, et al., "DiamondTouch: A Multi-User Touch Technology", Proceedings of UIST 2001, the 14th Annual ACM Symposium on User Interface Software and Technology, Mitsubishi Electric Research Laboratories, Nov. 2001, pp. 219-226.
Engelbart, et al., "A research center for augmenting human intellect", retrieved on Aug. 14, 2009 at <<http://sloan.stanford.edu/MouseSite/1968Demo.html, Fall Joint Computer Conference, AFIPS—Conference Proceedings, vol. 33, 1968, pp. 395-410.
Fallman, et al., "The Design of a Computer Mouse Providing Three Degrees of Freedom", Human-Computer Interaction, Part II, HCII 2007, Springer-Verlag Berlin Heidelberg, 2007, pp. 53-62.
"FingerWorks", retrieved on Aug. 14, 2009 at <<http://www.fingerworks.com>>, pp. 1-2.
Forlines, et al., "Direct-Touch vs. Mouse Input for Tabletop Displays", CHI 2007 Proceedings, Mobile Interaction Techniques I, 2007, pp. 647-656.
Greene, "A Touch of Ingenuity", MIT Technology Review, Sep./Oct. 2009, pp. 1-4.
"Gyration, Go Pro Air Mouse", retrieved on Aug. 14, 2009 at <<http://www.gyration.com/?l=en#productDetail/office/goProMouse>>, pp. 1-3.
Han, "Low-Cost Multi-Touch Sensing through Frustrated Total Internal Reflection", UIST 2005, ACM, 2005, pp. 115-118.
Hinckley, et al., "The VideoMouse: A Camera-Based Multi-Degree-of-Freedom Input Device", ACM UIST 1999, Symposium on on User Interface Software & Technology, CHI Letters 1 (1), pp. 103-112.
Hinckley, et al., "Touch-Sensing Input Devices", retrieved on Oct. 13, 2009 at <<http://delivery.acm.org/10.1145/310000/303045/p223-hinckley.pdf?key1=303045&key2=9404245521&coll=GUIDE&dl=GUIDE&CFID=57466035&CFTOKEN=99875617>>, CHI 1999, ACM, May 15-20, 1999, pp. 223-230.
Kim, et al., "Inflatable Mouse: Volume-adjustable Mouse with Air-pressure-sensitive Input and Haptic Feedback", CHI 2008 Proceedings—Post-WIMP, ACM, Apr. 2008, pp. 211-224.
Koike, et al., "Integrating Paper and Digital Information on EnhancedDesk: A Method for Realtime Finger Tracking on an Augmented Desk System", retrieved on May 11, 2009 at <<http://www.vogue.is.uec.ac.jp/~koike/papers/tochi/p307-koike.pdf>>, ACM Transactions on Computer-Human Interaction, vol. 8, No. 4, Dec. 2001, pp. 307-322.
"Laptop Users Prefer Mice over Touchpads, Survey", PC Business Products, Sep. 2003, 1 page.
Latulipe, et al., "Bimanual and Unimanual Image Alignment: An Evaluation of Mouse-Based Techniques", UIST 2005, ACM, 2005, pp. 123-131.
"Linux Finger-Sensing Pad Driver", retrieved on May 11, 2009 at <<http://sourceforge.net/projects/fsp-lnxdrv/>>, SourceForge.net, 2009, pp. 1-3.
MacKenzie, et al., "A Two-Ball Mouse Affords Three Degrees of Freedom", ACM SIGCHI Extended Abstracts 1997, Late-Breaking/Short Talks, pp. 303-304.
Malik, et al., "Interacting with Large Displays from a Distance with Vision-Tracked Multi-Finger Gestural Input", ACM, 2005, 1 page.
Matsushita, et al., "HoloWall: Designing a Finger, Hand, Body, and Object Sensitive Wall", UIST 1997, ACM, 1997, pp. 209-210.
Michelitsch, et al., "Multi-Finger Haptic Interaction within the MIAMM Project", retrieved on May 11, 2009 at <<http://miamm.loria.fr/doc_publique/publications/EuroHapticsAbstract.pdf>>, pp. 1-3.
"Microsoft Surface", retrieved on Aug. 14, 2009 at <<http://www.microsoft.com/surface/>>, Microsoft, 2009, pp. 1-3.
"Mighty Mouse", retrieved on Aug. 14, 2009 at <<http://www.apple.com/mightymouse/>>, Apple, pp. 1-3.
"MoGo Mouse BT", retrieved on Aug. 14, 2009 at <<http://www.newtonperipherals.com/mogo_mouseBT.html>>, Newton Peripherals, 2007, pp. 1-3.
Moscovich, et al., "Multi-Finger Cursor Techniques", Proceedings of Graphics Interface 2006, Quebec City, Canada, 2006, 7 pages.
"MX Air Rechargeable Cordless Air Mouse", retrieved on Aug. 14, 2009 at <<http://www.logitech.com/index.cfm/mice_pointers/mice/devices/3443&cl=US,EN>>, Logitech, 2009, pp. 1-4.

(56) References Cited

OTHER PUBLICATIONS

"Next step in Apple touch interface—multi-touch mouse", retrieved on Oct. 13, 2009 at <<http://pcjoint.com/2007/07/05/next-step-in-apple-touch-interface-multi-touch-mouse/>>, PC Joint, Jul. 5, 2007, pp. 1-2.
Pash, "Use Your iPhone as a Multi-Touch Mouse with Touchpad Pro", retrieved on Oct. 13, 2009 at <<http://lifehacker.com/363655/use-your-iphone-as-a-multi+touch-mouse-with-touchpad-pro>>, Lifehacker, Mar. 4, 2008, 1 page.
Rekimoto, "SmartSkin: An Infrastructure for Freehand Manipulation on Interactive Surfaces", CHI 2002, ACM, 2001, pp. 113-120.
Siek, et al., "Fat Finger Worries: How Older and Younger Users Physically Interact with PDAs", Proceedings of Interact 2005, 2005, pp. 267-280.
Siio, et al., "Real-World Interaction using the FieldMouse", Proceedings of ACM UIST 1999, ACM, 1999, pp. 113-119.
"TrackPoint Mouse", retrieved on May 11, 2009 at <<http://www.almaden.ibm.com/cs/user/tp/tpmouse.html>>, User System Ergonomics Research, Almaden Research Center, IBM Corporation, May 10, 2004, pp. 1-2.
Venolia, "Facile 3D Direct Manipulation", Proceedings of ACM SIGCHI 1993, INTERCHI 1993, ACM, Apr. 1993, pp. 31-36 and 547.
Wigdor, et al., "LucidTouch: A See-Through Mobile Device", UIST 2007, ACM, 2007, pp. 269-278.
Wobbrock, et al., "Gestures without Libraries, Toolkits or Training: A $1 Recognizer for User Interface Prototypes", UIST 2007, ACM, 2007, 10 pages.
Zimmerman, et al., "Applying Electric Field Sensing to Human-Computer Interfaces", Proceedings of ACM SIGCHI 1995, ACM, 1995, pp. 280-287.
"8-Bit Microprocessor Unit", Motorola Semiconductors, Freescale Semiconductor, Inc., Published 1982, Available at <<http://html.alldatasheet.com/html-pdf/356904/MOTOROLA/MC146805E2/387/1/MC146805E2.html>> 1 pg.
Office Action for U.S. Appl. No. 12/485,543, mailed on Jan. 9, 2012, Nicolas Villar, "Pointing Device with Independently Movable Portions", 15 pgs.
Office Action for U.S. Appl. No. 12/485,593, mailed on Dec. 23, 2011, David Alexander Butler, "Pointing Device Using Proximity Sensing", 23 pgs.

* cited by examiner

INDIRECT MULTI-TOUCH INTERACTION

BACKGROUND

Pointing devices are widely used to support human-computer interaction. Current pointing devices allow the user to move an on-screen cursor using movements of their arm and wrist (e.g. in the case of computer mouse devices) or their fingers and thumb (e.g. in the case of touch-pads and trackballs). Most users prefer mouse devices for regular use on a desktop setting, as mouse devices are generally considered to be more comfortable for extended use than other alternatives. Pointing devices can be characterized as providing indirect interaction, as the user interacts with a device to control an on-screen cursor, and the on-screen cursor manipulates objects, buttons or controls in the user interface. This can be distinguished from direct interaction methods such as touch-screens, where the user's touch directly manipulates the user interface.

Humans are naturally dexterous and use their fingers and thumbs to perform a variety of complex interactions with everyday objects to a high precision. Certain input movements and gestures are more easily accomplished by using the fine motor control of one or more fingers and thumb, rather than the gross motor control of the arm and wrist. For example, moving an object a fraction of a millimetre, or tracing an accurate path (for example, when drawing or writing) can be more quickly, easily and exactly accomplished by using fingers and thumb rather than with the arm and wrist. As a result of this, there is increasing interest in multi-touch interaction techniques, where the user interacts with a graphical user interface using more than one finger to control and manipulate on-screen objects.

Multi-touch interaction can be intuitive for users in a direct interaction environment (e.g. when used with touch-screens) as the users can directly visualize the effect of moving their fingers on the display. For indirect interaction, the use of multi-touch is less prevalent. For example, multi-touch enabled touch-pads can be used to provide limited indirect multi-touch input to a user interface, for example to control scrolling. However, for indirect interaction, multi-touch techniques are less intuitive and less accurate. The gestures that can be enabled by such a touch-pad are limited as the users cannot readily visualize how the multi-touch inputs are being interpreted in the user interface. As a result of this, the accuracy of the multi-touch input is reduced and only a small number of multi-touch gestures can be supported with a reasonable reliability.

The embodiments described below are not limited to implementations which solve any or all of the disadvantages of known indirect interaction devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Indirect multi-touch interaction is described. In an embodiment, a user interface is controlled using a cursor and a touch region comprising a representation of one or more digits of a user. The cursor and the touch region are moved together in the user interface in accordance with data received from a cursor control device, such that the relative location of the touch region and the cursor is maintained. The representations of the digits of the user are moved in the touch region in accordance with data describing movement of the user's digits. In another embodiment, a user interface is controlled in a first mode of operation using an aggregate cursor, and switched to a second mode of operation in which the aggregate cursor is divided into separate portions, each of which can be independently controlled by the user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a desktop computing-based system, the system described is provided as an example and not a limitation. As those skilled in the art will appreciate, the present examples are suitable for application in a variety of different types of computing systems.

Current indirect interaction techniques are not well suited for multi-touch input, as the users are not able to clearly visualize the gestures that they are making, and cannot tell where in the user interface the multi-touch gestures are being applied. This leads to inaccurate multi-touch inputs, thereby requiring only very simple gestures to be reliable. To address this, a technique for user interface interaction is provided that allows users to clearly understand and visualize multi-touch input when using indirect interaction. In particular, the user interfaces are controlled using cursors which provide visual feedback to the user on the relative positions of the user's digits, whilst clearly indicating where in the user interface the multi-touch input is to be applied.

Figure 1:
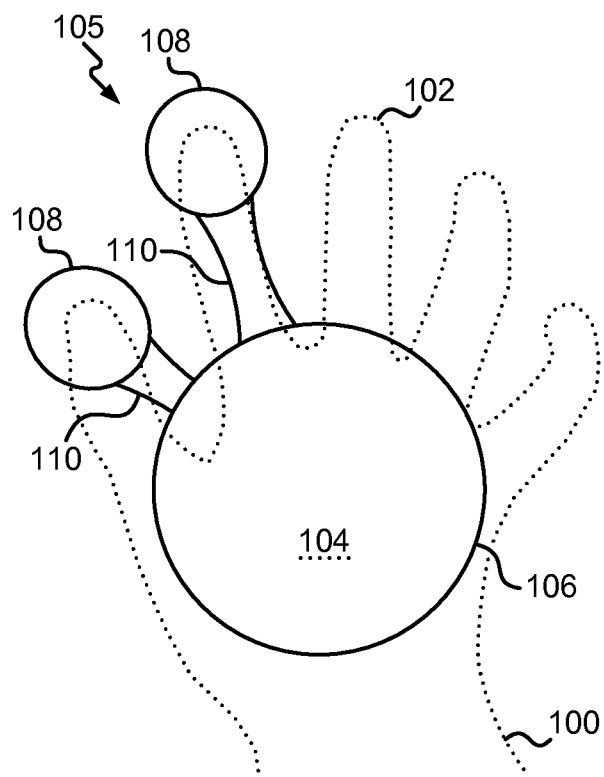
FIG. 1 illustrates a first example multi-touch mouse device.
Figure 2:
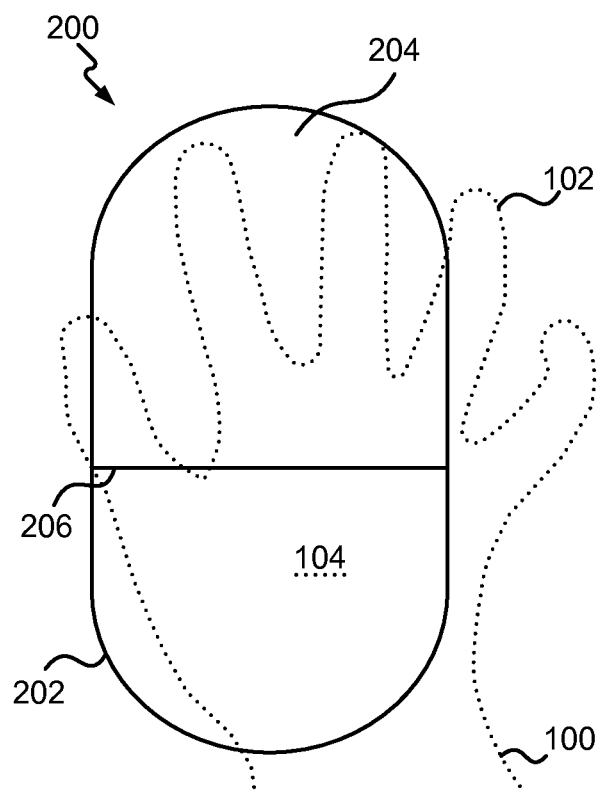
FIG. 2 illustrates a second example multi-touch mouse device.
Figure 3:
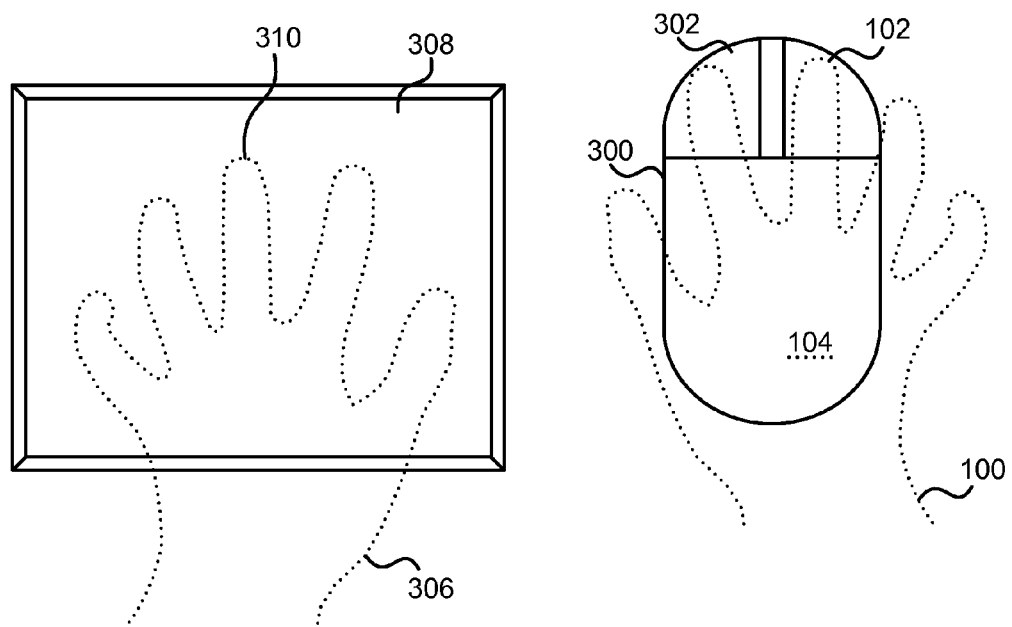
FIG. 3 illustrates multi-touch input from a mouse device and touch-pad.

Reference is first made to FIG. 1 to 3, which illustrate examples of different types of indirect interaction devices that can be used to provide multi-touch input.

FIG. 1 illustrates a schematic diagram of a first example of a multi-touch mouse device. A multi-touch mouse device is a pointing device that has properties in common with a regular mouse device (e.g. it is moved over a surface by the user) but also enables the input of multi-touch gestures.

FIG. 1 shows a hand 100 of a user having digits 102 and a palm 104, underneath which is resting the multi-touch mouse device 105. Note that the term 'digit' is intended herein to encompass both fingers and thumbs of the user. The multi-touch mouse device 105 comprises a base portion 106 and a plurality of satellite portions 108. Each satellite portion 108 is arranged to be located under a digit 102 of the user's hand 100.

In the example of FIG. 1, the satellite portions 108 are tethered to the base portion 106 by an articulated member 110. In other examples, however, the satellite portions 108 can be tethered using a different type of member, or not tethered to the base portion 106.

The base portion 106 comprises a movement sensor arranged to detect movement of the base portion 106 relative to a supporting surface over which the base portion 106 is moved. Using the movement sensor, the multi-touch mouse device 105 outputs a first data sequence that relates to the movement of the base portion 106. The data sequence can, for example, be in the form of an x and y displacement in the plane of the surface in a given time. Preferably, the movement sensor is an optical sensor, although any suitable sensor for sensing relative motion over a surface can be used (such as ball or wheel-based sensors). The base portion 106 can be arranged to act as a cursor control device, as described hereinafter.

Each of the satellite portions 108 comprises a further movement sensor arranged to detect movement of the satellite portion 108. Using the further movement sensors, the multi-touch mouse device 105 outputs a second data sequence that relates to the movement of each of the satellite portions 108 relative to the base unit 106. The further movement sensor in the satellite portion 108 can be, for example, an optical sensor, although any suitable sensor for sensing relative motion over a surface can be used (such as ball or wheel-based sensors). Buttons (not shown in FIG. 1) can also be provided on the satellite portions 108 and/or the base portion 106. The buttons provide analogous input to a 'mouse click' on a traditional computer mouse device.

The multi-touch mouse device 105 is arranged to communicate the first and second data sequences to a user terminal. For example, the multi-touch mouse device 105 can communicate with the user terminal via a wired connection (such as USB) or via a wireless connection (such a Bluetooth).

In use, the base portion 106 is arranged to be movable over a supporting surface (such as a desk or table top). The satellite portions 108 are also arranged to be movable over the supporting surface, and are independently movable relative to the base portion 106 and each other. In other words, the tethering (if present) between the satellite portions 108 and the base portion 106 is such that these elements can be moved separately, individually, and in differing directions if desired.

The multi-touch mouse device 105 therefore provides to the user terminal data relating to the overall movement of the device as a whole (from the first sequence describing the movement of the base portion 106) and also data relating to the movement of individual digits of the user (from the second data sequence describing the movement of each of the satellite portions 108). The user of the multi-touch mouse device 105 can move the base unit 106 in a similar fashion to a regular mouse device, and also provide multi-touch gestures by moving the satellite portions 108 using their digits.

Note that whilst the example multi-touch mouse device 105 shown in FIG. 1 comprises two satellite portions 108, other examples can have only one satellite portion, or three, four or five satellite portions 108, as appropriate. Furthermore, in other examples, different types of sensors or multiple motion sensors can be used to enable detection of different types of motion, e.g. to detect rotation of the base portion. In such examples, the user can perform a rotation of the base portion, which provides a data sequence that can be processed to control the rotation of on-screen objects.

Reference is now made to FIG. 2, which illustrates a schematic diagram of a second example of a multi-touch mouse device 200. FIG. 2 again shows the hand 100 of the user having digits 102 and a palm 104 underneath which is resting the second multi-touch mouse device 200. The multi-touch mouse device 200 comprises a base portion 202 and a touch-sensitive portion 204 overlaid on the base portion 202.

As with the multi-touch mouse device of FIG. 1, the base portion 202 of the multi-touch mouse device 200 of FIG. 2 comprises a movement sensor arranged to detect movement of the base portion 202 relative to a supporting surface over which the base portion 202 is moved. Using the movement sensor, the multi-touch mouse device 200 outputs a first data sequence that relates to the movement of the base portion 202. The first data sequence can, for example, be in the form of an x and y displacement in the plane of the surface in a given time. Preferably, the movement sensor is an optical sensor, although any suitable sensor for sensing relative motion over a surface can be used (such as ball or wheel-based sensors). The base portion 202 can be arranged to act as a cursor control device, as described hereinafter.

The touch-sensitive portion 204 is arranged to sense one or more of the user's digits in contact with the touch-sensitive portion 204. The touch-sensitive portion 204 can comprise, for example, a capacitive touch sensor. Using the touch-sensitive portion 204, the multi-touch mouse device 200 outputs a second data sequence that relates to the position and movement on the touch-sensitive portion 204

(and hence relative to the base unit 202) of any of the user's digits in contact with the touch-sensitive portion 204. The extent of the touch-sensitive portion 204 can be shown with a demarcation 206, for example a line, groove or bevel.

The multi-touch mouse device 200 is arranged to communicate the first and second data sequences to the user terminal, e.g. via a wired connection (such as USB) or via a wireless connection (such a Bluetooth). The multi-touch mouse device 200 in FIG. 2 therefore provides to the user terminal data relating to the overall movement of the device as a whole (from the first sequence describing the movement of the base portion 202) and also data relating to the movement of individual digits of the user (from the second data sequence describing the movement of each digit touching the touch-sensitive portion 204). The user of the multi-touch mouse device 200 can move the base unit 202 in a similar fashion to a regular mouse device, and also provide multi-touch gestures by moving their digits on the touch-sensitive portion.

The multi-touch mouse devices shown in FIGS. 1 and 2 are examples only, and other configurations of multi-touch mouse devices can also be used. Different types of multi-touch mouse device are described in U.S. patent application Ser. Nos. 12/485,843, 12/485,593, 12/425,408, and 60/164,830, incorporated herein by reference in their entirety.

FIG. 3 illustrates an alternative indirect interaction arrangement that does not make use of multi-touch mouse devices. In the example of FIG. 3, the user is using two hands to interact with a user terminal. The first hand 100 of the user is operating a regular mouse device 300, which rests under the palm 104 of the hand 100, and buttons 302 can be activated by the user's digits 102. A second hand 306 of the user is operating a separate touch-pad 308. The touch-pad 308 senses the position and movement of one or more digits 310 in contact with the touch-pad 308.

In the arrangement of FIG. 3, the first hand 100 is used to control the movement of the mouse device 300 over a surface, which is detected and communicated to the user terminal in a first data sequence. The mouse device 300 acts as a cursor control device. The position and movement of the one or more digits 310 in contact with the touch-pad 308 is communicated to the user terminal in a second data sequence.

In one example, the touch-pad 308 can be incorporated into the body of a laptop computer, and the mouse device 300 connected to the laptop computer via a wired or wireless link. In another example, the touch-pad 308 can be a portion of a touch-screen, such as a portion of a surface computing device, and the mouse device 300 can be connected to the surface computing device. In alternative examples, both the mouse device 300 and the touch-pad 308 can be separate from the user terminal.

Alternative indirect interaction arrangements or devices can also be used with the techniques described herein, but are not shown in the figures. For example, a user can operate a multi-touch touch-pad that is able to sense the position and movement of a plurality of digits of one or more hands of the user, as outlined in more detail hereinafter.

The one or more indirect interaction devices, such as those described above, are arranged to connect to a user terminal. The user terminal can be in the form of, for example, a desktop, laptop, tablet or surface computer or mobile computing device. The user terminal comprises a least one processor configured to execute an operating system, application software and a user interface. The user interface is displayed on a display device (such as a computer screen) connected to or integral with the user terminal. Input from the indirect interaction devices are used to control the user interface and manipulate on-screen objects.

Figure 4:
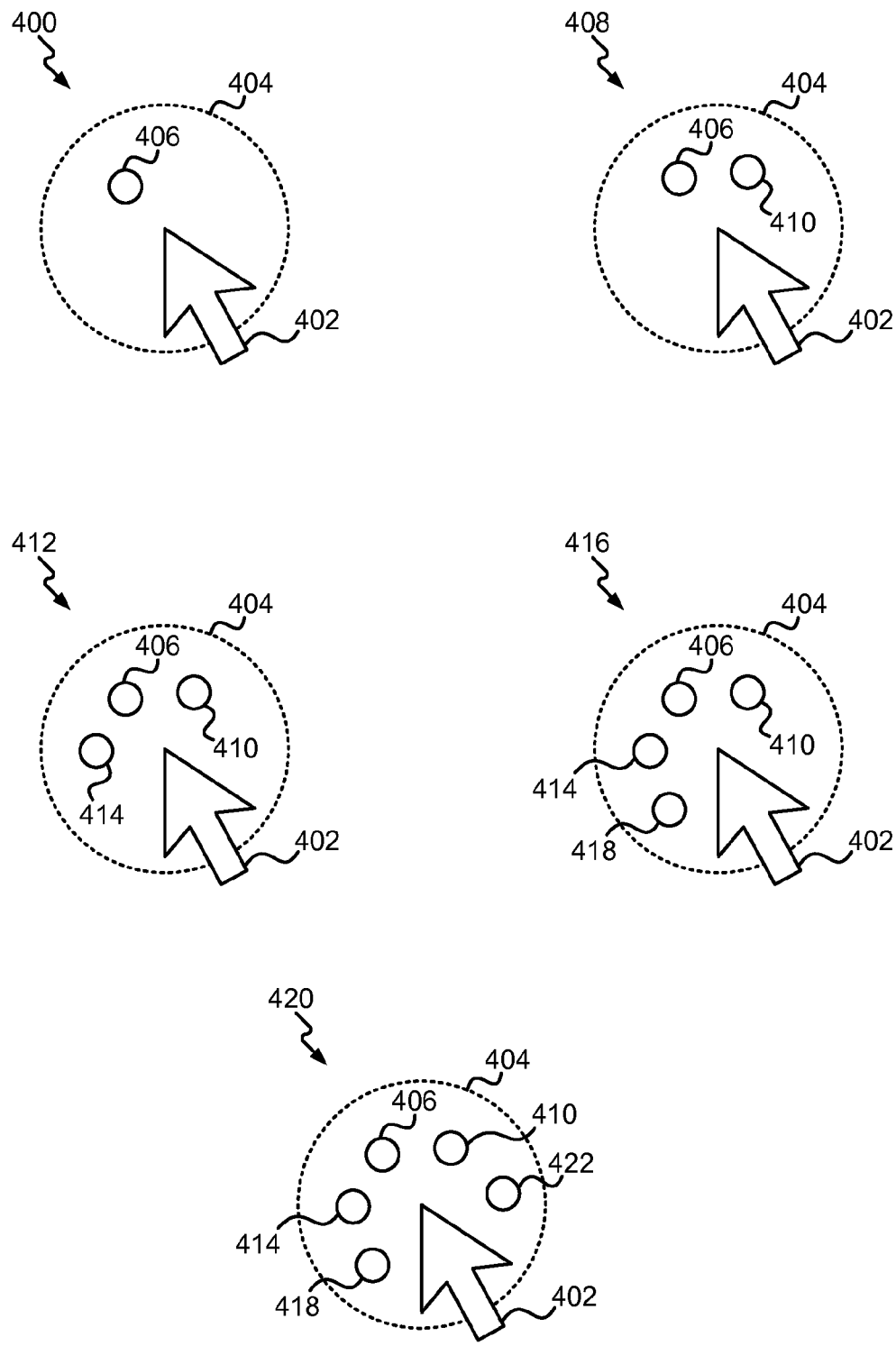
FIG. 4 illustrates a first example multi-touch pointer.
Figure 5:
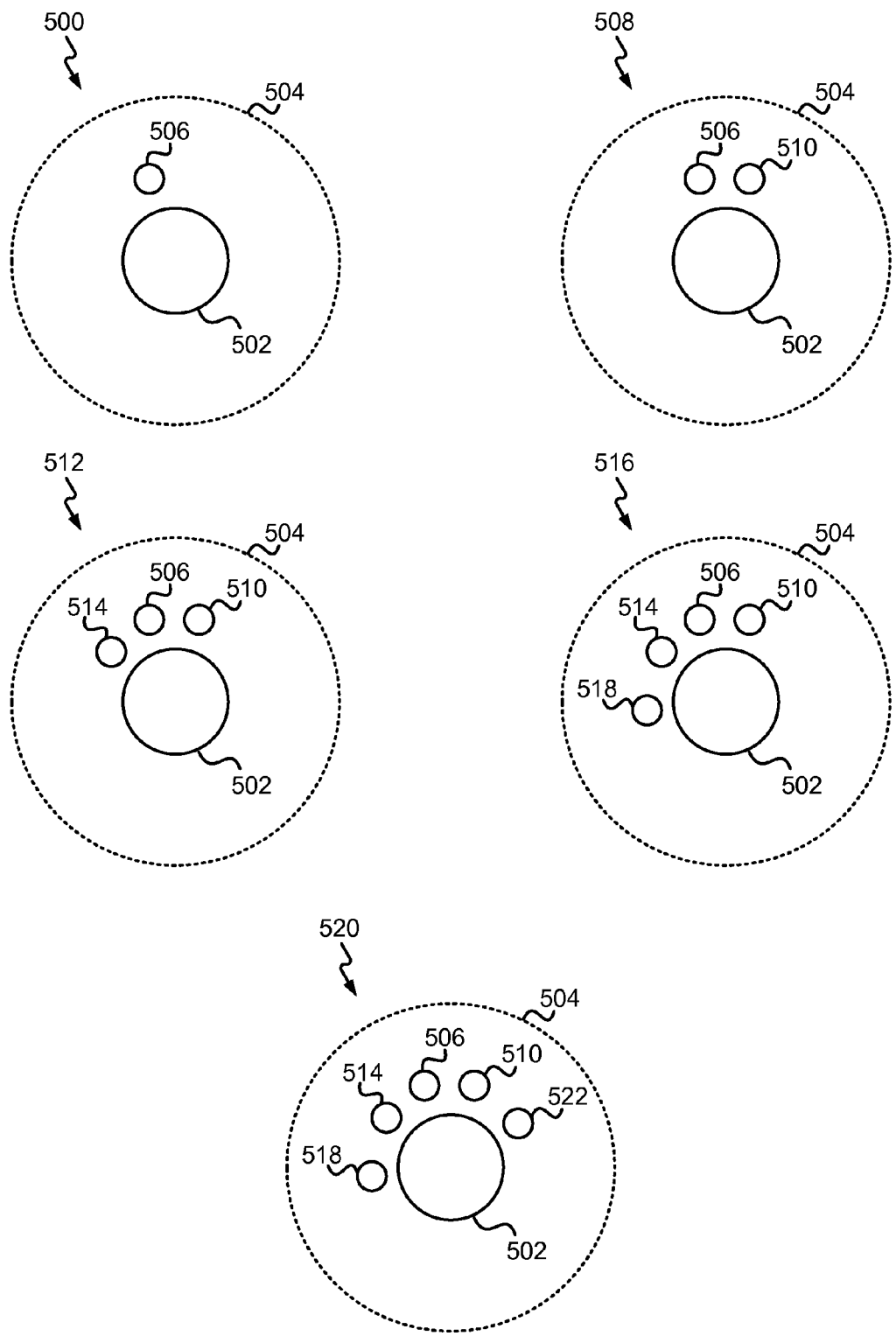
FIG. 5 illustrates a second example multi-touch pointer.
Figure 6:
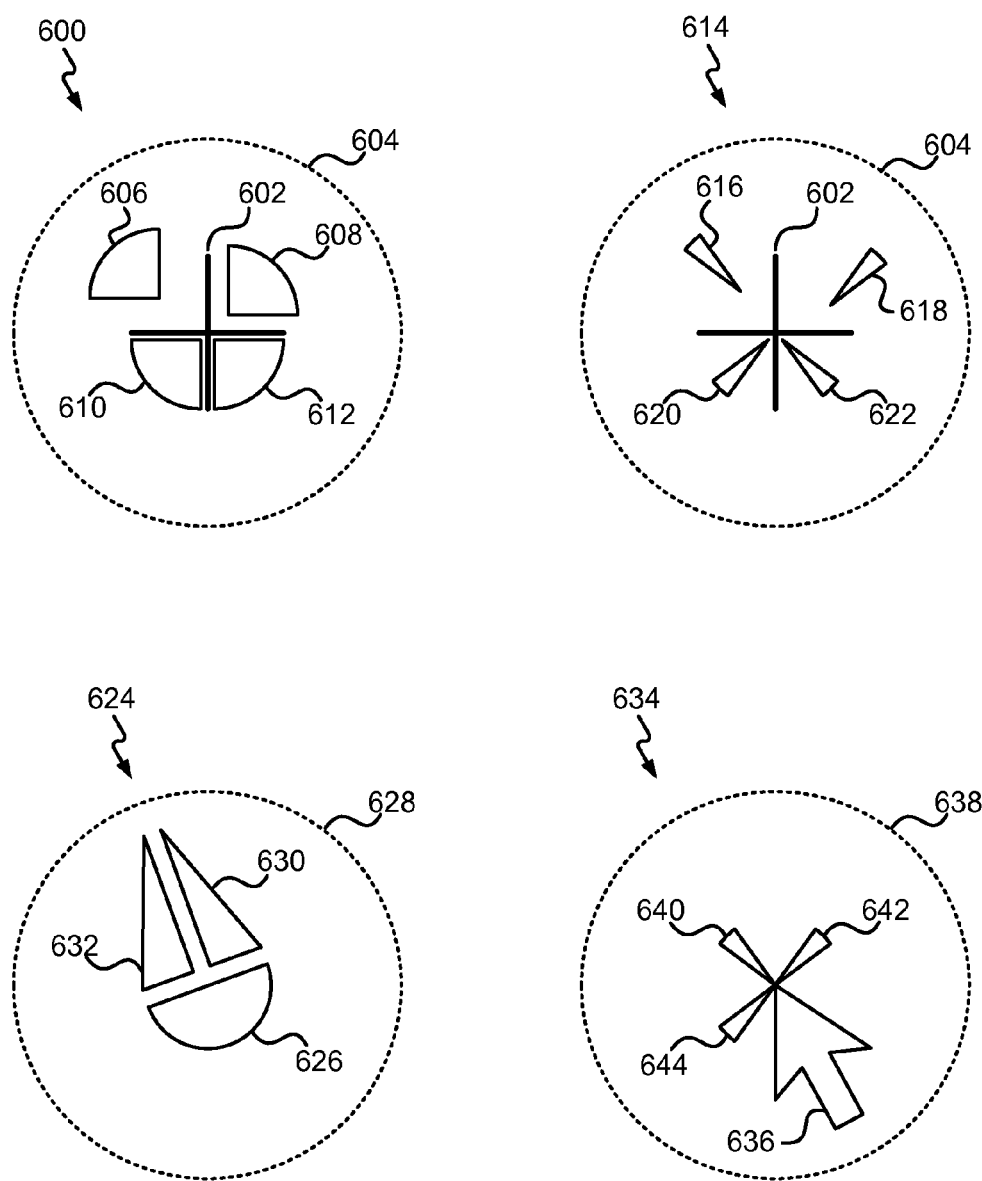
FIG. 6 illustrates further example multi-touch pointers.

Reference is now made to FIGS. 4, 5 and 6, which illustrate examples of cursors that can be displayed in the user interface on the display device and are controlled by any of the indirect interaction devices described above, and which provide visual feedback of multi-touch inputs to the user.

FIG. 4 illustrates a traditional arrow-shaped cursor augmented with information regarding the position of the digits of the user. In a first example 400, an arrow-shaped cursor 402 is rendered in a user interface, and surrounding a control point of the cursor 402 (e.g. the tip of the arrow head) is a touch region 404. Within the touch region 404 is displayed a representation of the relative positions and movement of the digits of the user. The first example 400 shows a single representation 406, corresponding to a single digit of the user. The number of digits shown can depend on the number of digits detected (e.g. in the case of touch-sensitive hardware such as in FIG. 2 or 3) or on the capabilities of the hardware used (e.g. the number of satellite portions of the mouse device of FIG. 1).

The combination of the cursor and the touch region showing representations of the user's digits can be controlled to improve the usability and accuracy of multi-touch inputs, as described in more detail hereinafter. A cursor augmented with representations of the user's digits is referred to herein as a 'multi-touch pointer'. In the first example 400, multi-touch input can be provided by the relative movement of the representation 406 and the cursor 402.

The touch region 404 shown in FIG. 4 is illustrated with a dashed line. Preferably, the boundary of the touch region 404 is not visible to the user in the user interface. However, in other examples, the touch region 404 can be displayed to the user, e.g. by drawing the boundary or shading the interior of the touch region.

Whilst the shape of the touch region 404 shown in FIG. 4 is circular, any suitable shape for the touch region can be used. The shape of the touch region 404 can, for example, reflect the shape of the hardware used for indirect interaction. For example, if the user's digits are detected on a touch-pad, the shape of the touch-region can reflect the shape of the touch pad. The size of the touch region in FIG. 4 is also merely illustrative, and can be larger or smaller as preferred for the application in question or defined by the indirect interaction hardware. Furthermore, in other examples, the touch region 404 can be located away from the control-point of the cursor, for example to the side of or above the cursor in the user interface. In further examples, the location of the touch region relative to the cursor can be controlled by the user. For example, the user can choose where in relation to the cursor the touch region is displayed, or choose to temporarily fix the touch region at a given location in the user interface.

A second example 408 of a multi-touch pointer shows a second representation 410 of a second digit being displayed. The addition of a second representation 410 enables multi-touch input to be provided by the relative movement of the two representations 406, 410, as well as their movement relative to the cursor 402. A third example 412 shows the addition of a third representation 414 of a digit. A fourth example 416 shows the addition of a fourth representation 418 of a digit. A fifth example 420 shows the addition of a fifth representation 422 of a digit.

An alternative arrangement of a multi-touch pointer is shown in FIG. 5. In the example, of FIG. 5, the cursor is not a traditional arrow shape, but instead more closely reflects the interaction hardware being used to control the cursor. FIG. 5 shows an example cursor for the case where the multi-touch mouse device of FIG. 1 is used as the indirect interaction device. In this case, the cursor 502 is circular, which reflects the shape of the base portion 106 of the multi-touch mouse device 105. A touch region 504 is again present, and representations of the positions of the user's digits are displayed in the touch region 504 (one representation 506 in example 500; two representations 506, 510 in example 508; three representations 506, 510, 514 in example 512; four representations 506, 510, 514, 518 in example 516; and five representations 506, 510, 514, 518, 522 in example 520).

Therefore, in the example of FIG. 5, the cursor and digit representations displayed in the user interface closely mirror the look, current position and movement of the multi-touch mouse device 105 used to interact with the user interface. This enables the user to readily and closely link interaction with the indirect interaction device with the displayed multi-touch pointer.

Reference is now made to FIG. 6, which illustrates several further alternative examples of a multi-touch pointer having a cursor and digit representations. Example 600 comprises a cursor 602 taking the form of a cross-hair. Surrounding the cross-hair cursor 602 is a touch region 604 comprising four representations 606, 608, 610, 612 of the user's digits each in the shape of a quadrant arranged to fit with the cross-hair cursor 602. The representations can, for example, be arranged to 'dock' or fit with the cross-hair cursor 602 when multi-touch input is not being provided, and detach from the cross-hair cursor 602 when multi-touch is being used.

Example 614 is similar to example 600, except that digit representations 616, 618, 620, 622 are wedge-shaped rather than quadrants. The wedge shapes do not occlude as large a portion of the user interface as the quadrants, and have a more pronounced 'point' that can act as the control point.

Example 624 comprises a cursor 626 in the shape of a semi-circle, and the digit representations 630, 632 are triangles. Therefore, in this example, when the digit representations 630, 632 are joined with the cursor 626 (e.g. when not using multi-touch) the overall shape is similar to a traditional arrow-shaped cursor. Example 634 comprises a traditional arrow-shaped cursor 636 and a touch region 638 in which the representations 640, 642, 644 are wedge-shaped, and which, when not used for multi-touch input, are in contact with the control point of the cursor 636.

As mentioned previously, for all of these multi-touch pointer examples, the location, size and shape of the touch regions can be varied, as can the shape, size and number of digit representations.

Figure 7:
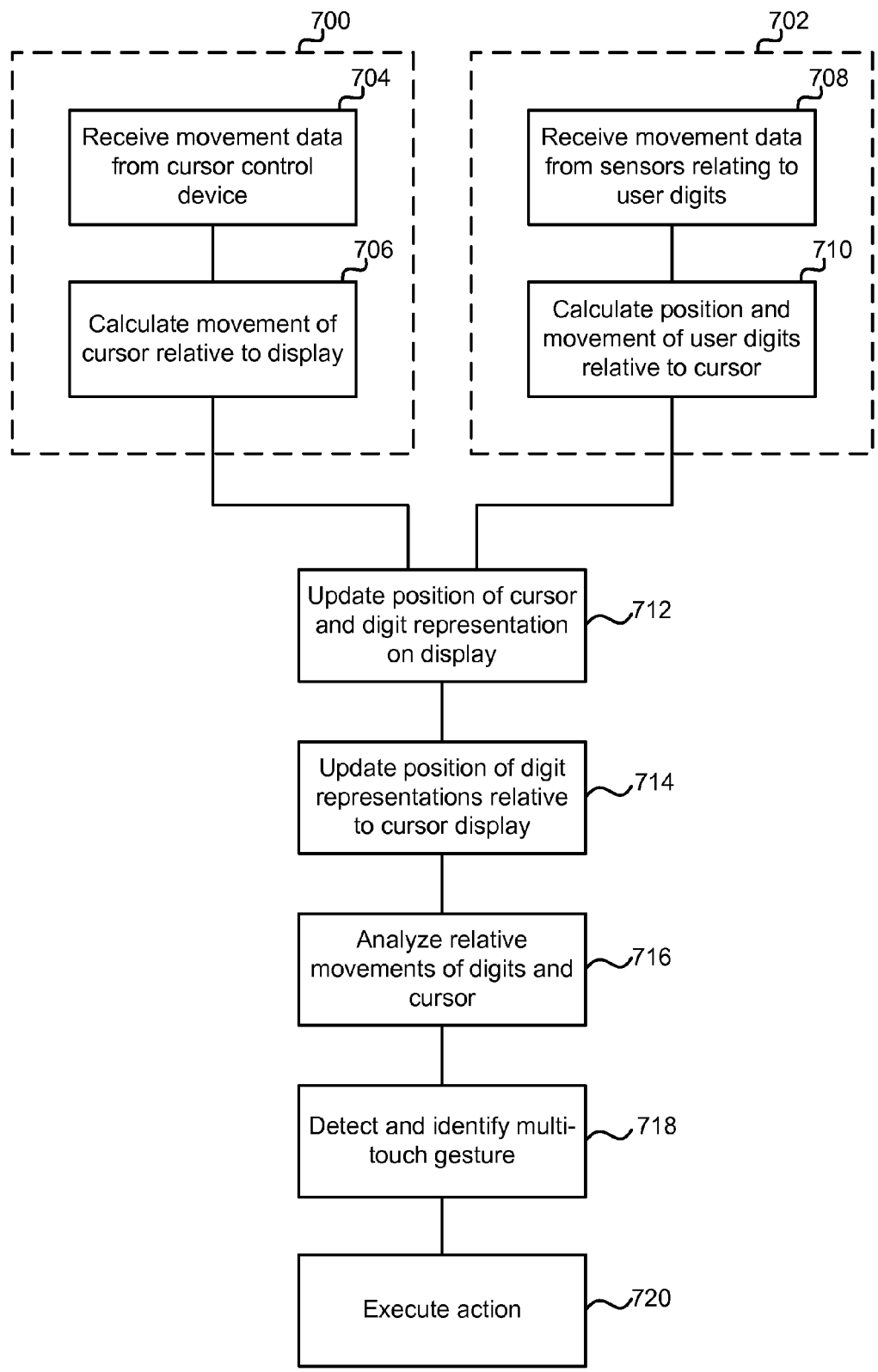
FIG. 7 illustrates a flow chart for controlling a user interface using a multi-touch pointer.

Reference is now made to FIG. 7, which illustrates a process for controlling and displaying a multi-touch pointer such as those shown in FIG. 4 to 6 using indirect interaction devices such as those in FIG. 1 to 3. FIG. 7 shows a process performed to process the first data sequence describing the overall movement of a cursor control device (e.g. the base potion 106, 202 or mouse device 300) and the second data sequence describing the position and movement of the user's digits. Note that the process shown in FIG. 7 can be performed by the processor of the user terminal, a processor in the indirect interaction device, or, alternatively, the processing of FIG. 7 can be split between a processor in the indirect interaction device and in the user terminal.

FIG. 7 shows two initial branches which can be processed substantially concurrently. A first branch 700 processes the first data sequence from the cursor control device (e.g. the base portion 106, 202 or mouse device 300), and a second branch 702 processes the second data sequence from the digit sensors (e.g. the touch-pad or satellite portions). Whilst these two branches can be analyzed in parallel, they can also be alternately performed in a time sequence, such that, from the perspective of the user, they appear to be substantially concurrent.

Considering the first branch 700, firstly the first data sequence from the cursor control device is received 704. As mentioned above, the first data sequence describes the larger-scale motion of the users hand over a surface, for example in moving a mouse device. The received data is then analyzed 706. The analysis of the data determines the movement of the cursor control device relative to the surface in a given timeframe. The movement of the cursor control device relative to the surface can then be translated to the corresponding movement of the cursor in the user interface relative to the user interface display.

Considering now the second branch 702 (the processing of which is performed substantially concurrently with the first branch 700), the second data sequence relating to the location of the user's digits is received 708. The position and movement of the user's digits is then calculated 710 relative to the cursor. For example, in the case of the multi-touch mouse device of FIG. 1, the position and movement of each of the satellite portions 108 relative to the base portion 106 are calculated (as the base portion 106 defines the cursor position). In the case of the multi-touch mouse device of FIG. 2, the position and movement of any digits on the touch-pad 204 are determined. These positions are inherently relative to the cursor as the base portion 202 defines the cursor movement, and the touch-pad 204 moves with the base portion 202. In the case of a two-handed system such as that in FIG. 3, the position and movement of any digits on the touch-pad 308 are mapped to the cursor location. For example, a fixed point on the touch-pad 308 (such as its mid-point) is mapped to the cursor location, such that the position and movement of the digits relative to the fixed point can be translated to the position and movement of the digits relative to the cursor.

Optionally, further data sequences can also be received and processed (not shown in FIG. 7), for example relating to the activation status of one or more buttons or keys.

The multi-touch pointer representation (such as that shown in FIG. 4 to 6) is updated 712 in the user interface shown on the display device to reflect any movement of the cursor control device. The calculated movement of the cursor relative to the display is used to move the multi-touch pointer as a whole in the user interface, including both the cursor and the representation of the user's digits in the touch region. In other words, the movement of the cursor control device determines the overall movement of the entire multi-touch pointer. Movement of a digit (e.g. on a satellite portion or touch-pad) in isolation, without moving the cursor control device, does not move the whole multi-touch pointer.

The positions of the representations of the user's digits in the touch region are updated 714 in accordance with the calculated digit movement relative to the cursor. In other words, the location in the touch region of each representation is updated to reflect detected and calculated movement of the corresponding digit. The location of the multi-touch pointer as a whole in the user interface is not affected by the movement of the user's digits.

Therefore, in summary, movement of the cursor control device moves the cursor on the display, and the touch region comprising the representations of the user's digits follow the cursor movement. Movement of a given digit by the user moves the corresponding representation in the touch region.

The calculated movement of the digit representations and the cursor relative to each other are analyzed 716. The analysis can comprise analysis of the relative motion of the digit representations to each other, and the analysis of the motion of any given digit representation to the cursor motion. The relative movement analysis is used to detect and identify 718 a multi-touch gesture. Various types of multi-touch gesture are illustrated hereinafter with reference to FIG. 8 to 14. The types of multi-touch gesture that can be detected can be contextual such that they depend upon the context in which the multi-touch pointer is being used. For example, if the cursor is pointing to a specific on-screen object such as an image then certain multi-touch gestures can be available to manipulate that object, whereas if the cursor is pointing at some text, then different multi-touch gestures can be enabled.

Responsive to detecting a particular multi-touch gesture, a corresponding action is executed 720 by the processor at the user terminal. For example, a particular detected gesture can be mapped to a user interface control, such that parameters derived from the gesture (e.g. the size or angle of the gesture) are translated to corresponding software controls. The user interface control is provided to a software program in order to control the display on the user interface, for example to manipulate an on-screen object. In an alternative example, if the gesture is mapped to the execution of a software program, the actuation of a function or a selection from a menu, then an appropriate command is created. The control input derived from the gesture can control either the operating system or application software executed on the operating system.

Reference is now made to FIG. 8 to 14, which illustrate the operation of the flowchart of FIG. 7 in controlling the multi-touch pointer. The examples of FIG. 8 to 14 are illustrated using the multi-touch mouse device of FIG. 1 and the multi-touch pointer of FIG. 4. However, in other examples, any other suitable indirect interaction device and multi-touch pointer can be used.

Figure 8:
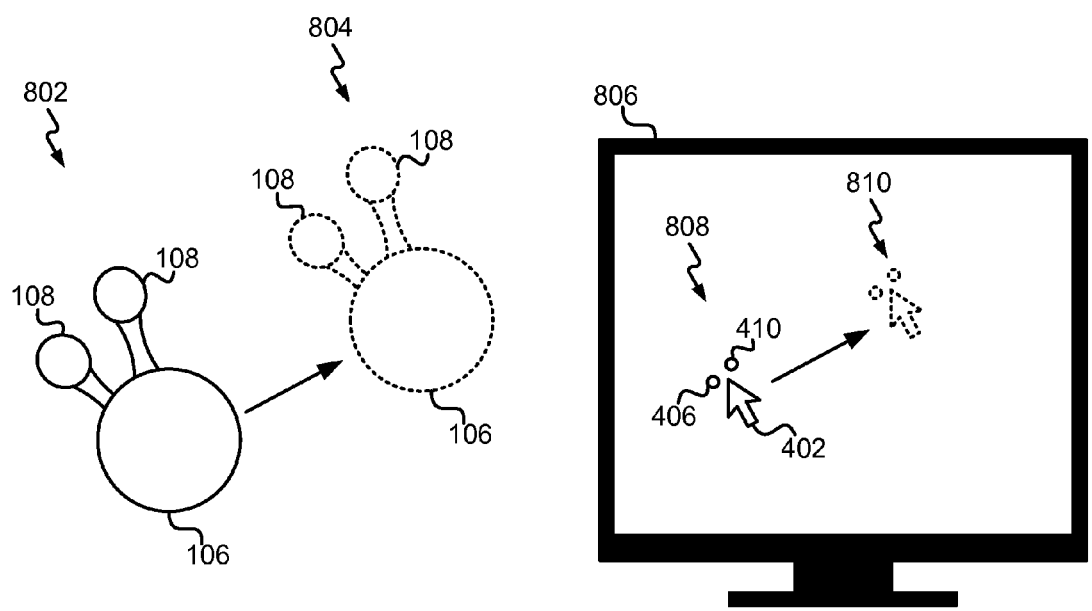
FIG. 8 illustrates movement of a multi-touch pointer in a user interface.

FIG. 8 illustrates the movement of a multi-touch pointer in a user interface. In the example of FIG. 8, the multi-touch mouse comprising base portion 106 and two satellite portions 108 is moved by the user from a first position 802 to a second position 804. Note that, in this movement, the position of the satellite portions 108 relative to the base portion does not substantially change. The multi-touch pointer comprising cursor 402 and representation 406 and 410 is displayed in a user interface shown on display device 806. When the multi-touch mouse is in the first position 802, the multi-touch pointer is also in a first position 808. As the multi-touch mouse is moved to the second position 804, the on-screen multi-touch pointer moves to a second position 810.

Note that as the cursor 402 moves across the display, so too do the representations 406 and 410. In addition, because the satellite portions 108 are not moving relative to the base portion 106 during the motion, the representations 406 and 410 do not move relative to the cursor 402. Therefore, the behavior of the multi-touch mouse device and pointer in the example of FIG. 8 is similar to that of a traditional mouse and on-screen cursor, and hence familiar to users.

Figure 9:
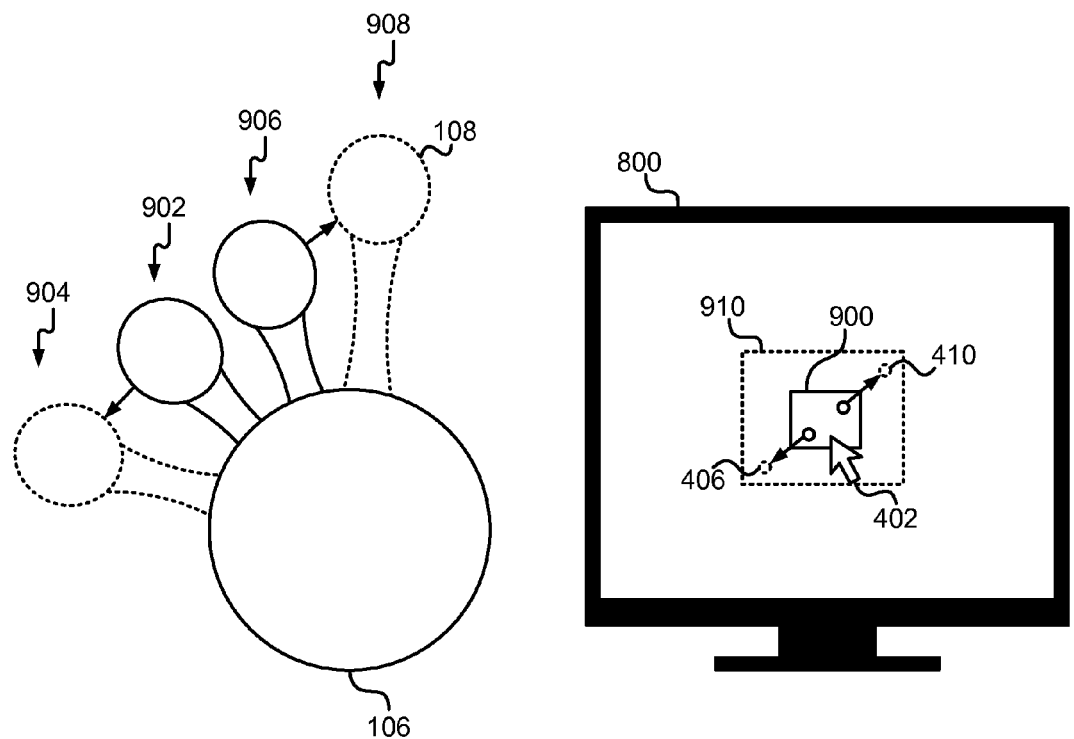
FIG. 9 illustrates a first scaling gesture using a multi-touch pointer.

Reference is now made to FIG. 9, which illustrates the use of the multi-touch pointer to input a scaling or zooming multi-touch gesture. In this example, the base portion 106 of the multi-touch mouse is maintained in a substantially constant position. The cursor 402 and representation 406 and 410 are positioned over an object 900 such as an image in the user interface shown on the display device 800. One of the satellite portions 108 is moved from a first position 902 outwards to a second position 904 and, similarly, the other satellite portion 108 is moved from a first position 906 outwards to a second position 908. Therefore, the digits of the user are spreading apart from an initial position in which they are close together.

As the movement is performed by the user's digits, the representations 406 and 410 of the user's digits shown in the user interface also spread apart relative to the cursor in accordance with the detected motion. The spreading apart gesture of the user's digits is recognized and identified as a scaling gesture. Because the cursor 402 is located over an on-screen object 900, it can be determined that the scaling gesture is to be applied to this object. The on-screen object 900 is then stretched or scaled by an amount relating to the separation of the representations 406 and 410, such that a larger object 910 is displayed.

Note that the selection of an object to which a multi-touch gesture is to be applied can be performed in a number of ways. For example, multi-touch gestures can be applied whenever the cursor 402 is 'hovering' over an object, or whenever an object is explicitly selected by the user, e.g. using a mouse 'click' or in combination with activation of a button or key. In further examples, the selection of an object on which to perform a multi-touch gesture by one of the above methods can result in the touch region becoming 'detached' from the cursor. In other words, after selection of an object, the touch region is fixed in position over the object and the user can manipulate the object using multi-touch gestures, whilst the cursor is able to be moved independently of the touch region. Once the multi-touch gestures are completed on the object, the touch region can return to following the cursor. These options for the selection of objects and control of the touch region apply to all multi-touch gestures described herein.

Figure 10:
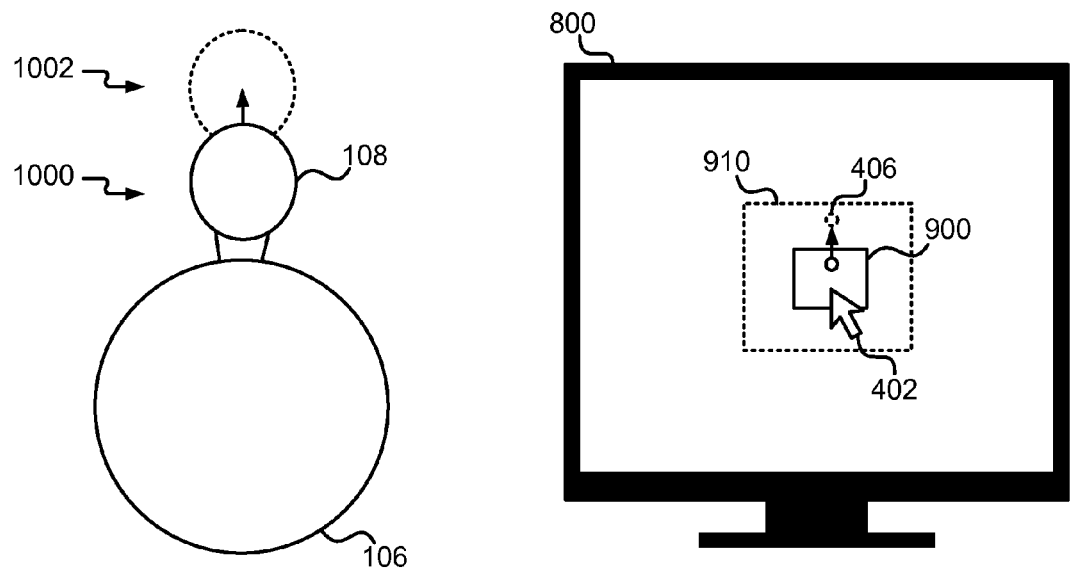
FIG. 10 illustrates a second scaling gesture using a multi-touch pointer.

FIG. 10 illustrates a similar scaling gesture to that in FIG. 9, except that FIG. 10 only uses the movement of a single digit of the user. In this example, the single satellite portion is moved from a first position 1000 close to the base portion 106, away from the base portion 106 whilst the base portion remains substantially stationary. This is reflected in the user interface, as the cursor 402 remains in a substantially constant position, whilst the representation 406 moves away from the cursor.

The movement of the representation 406 relative to the cursor 402 is monitored, and it is detected that the representation 406 is moving away from the cursor 402. The relative motion of the cursor 402 and representation 406 is interpreted as a scaling gesture, and this is applied to the on-screen object 900 selected by the cursor 402. The example of FIG. 10 therefore differs from that in FIG. 9 in that the multi-touch gesture is being provided by the relative motion of the cursor 402 and the single representation 406, where the cursor position is acting as a fixed point on the object 900, and the representation position determines the extent to which the object 900 is stretched. Optionally, the cursor can be configured to act as a fixed point responsive to a button or key press.

Figure 11:
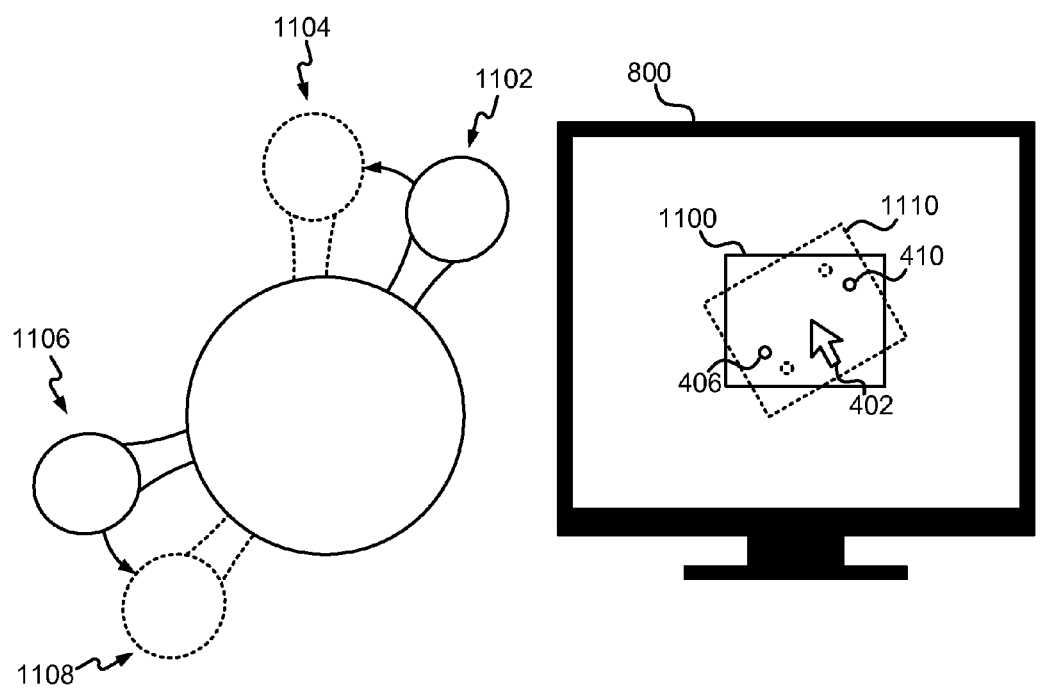
FIG. 11 illustrates a first rotation gesture using a multi-touch pointer.

Reference is now made to FIG. 11, which illustrates how a rotation gesture can be made using a multi-touch pointer. In this example, the base portion 106 of the multi-touch mouse is again maintained in a substantially constant position. The cursor 402 is positioned over an object 1100 (such as an image) in the user interface shown on the display device 800. The satellite portions 108 are initially positioned such that the representations 406 and 410 are generally at opposing corners of the object 1100.

The satellite portions 108 are moved using a substantially rotational motion, such that one of the satellite portions 108 moves from a first position 1102 around to a second position 1104 (i.e. an anti-clockwise motion relative to the base portion 106) and, similarly, the other satellite portion 108 is moved from a first position 1106 around to a second position 1108 (also anti-clockwise relative to the base portion 106). Therefore, the digits of the user are rotating about the base portion 106.

As the movement is performed by the user's digits, the representations 406 and 410 of the user's digits shown in the user interface also rotate relative to the cursor in accordance with the detected motion. The relative movement of the user's digits is recognized and identified as a rotational gesture. As above, because the cursor is located over an on-screen object 1100, it can be determined that the scaling gesture is to be applied to this object. The on-screen object 1100 is then rotated through an angle relating to the rotation of the representations 406 and 410, such that a rotated object 1110 is displayed. In alternative examples, the gesture shown in FIG. 11 can be performed by the user rotating the base portion 106 whilst maintaining the relative alignment of the satellite portions 108 to each other (thereby rotating the satellite portions around the base portion as shown in FIG. 11). Such a gesture can utilize additional or alternative sensors in the base unit, such as rotation sensors.

Figure 12:
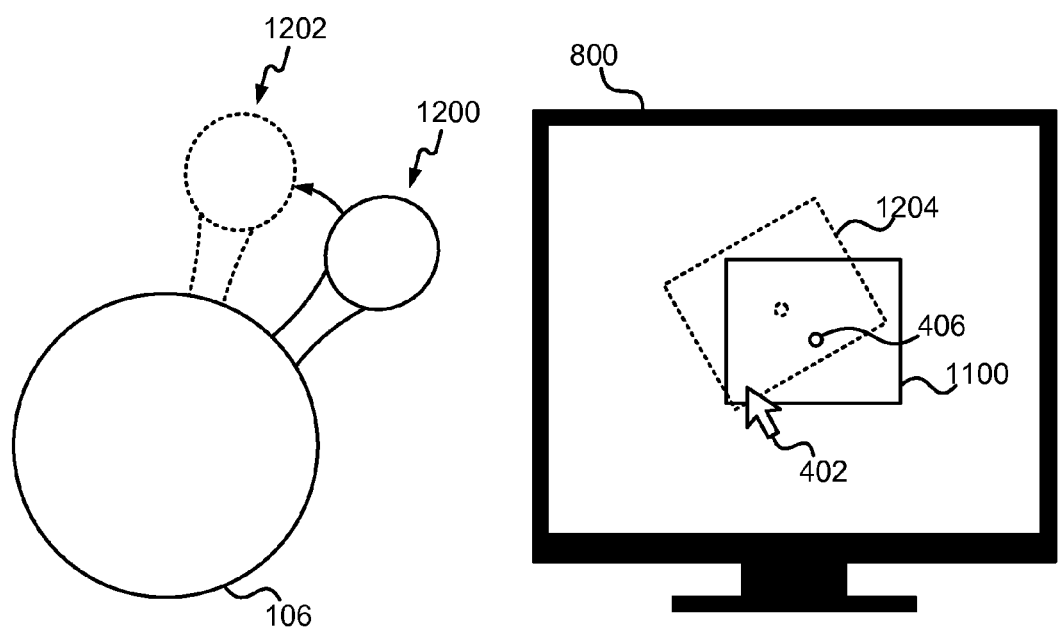
FIG. 12 illustrates a second rotation gesture using a multi-touch pointer.

The example of FIG. 11 used the motion of two representations to define the rotation. In a further example, one representation can be arranged to act as a pivot point for the on-screen object, and the motion of the other representation can be used to define the rotation of the object about the pivot point. FIG. 12 illustrates a further example in which a single digit of the user can be used to control rotation. In the example of FIG. 12, the cursor 402 is acting as a pivot point, and defining a point about which the on-screen object 1100 is rotated. The cursor 402 is moved to the location about which the object 1100 is to be rotated by moving the base portion 106, and then remains substantially stationary at this location. The satellite portion 108 is in a first position 1200 such that the representation is located over another part of the object 1100, and moved to a second position 1202 in a rotational motion. The representation 406 moves in accordance with the movement of the satellite portion, and, due to the detection of the rotation gesture, the on-screen object is also rotated about the cursor location to show the rotated object 1204.

Figure 13:
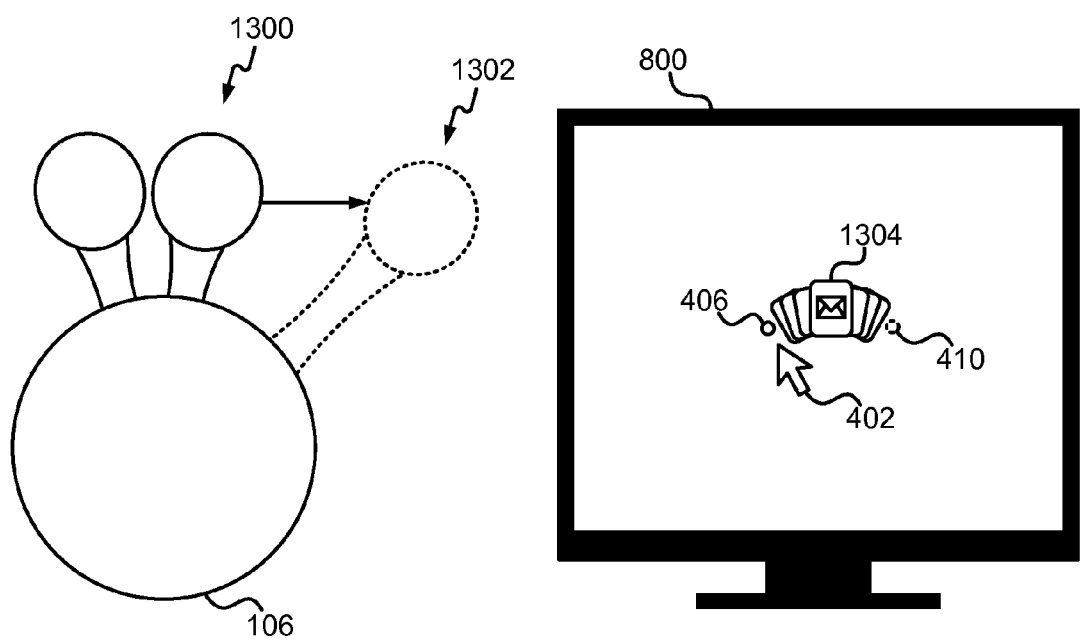
FIG. 13 illustrates a shortcut menu display gesture using a multi-touch pointer.

Reference is now made to FIG. 13, which illustrates the use of the multi-touch pointer to perform an action other than manipulating an on-screen object. In the example of FIG. 13, the multi-touch pointer is used to display a shortcut menu. The user performs a gesture using their digits to trigger the display of an on-screen menu. For example, the user can perform a sweeping gesture with one digit, such that one satellite portion 108 moves from a first position 1300 to a second position 1302. The sweeping gesture is detected, and this triggers the display of a menu 1304 in the space between representation 406 and representation 410. Once the menu 1304 is displayed, the user can then select an item from the menu, for example using one of the representations 406 or 410, or using the cursor 402. The action corresponding to the menu item is then executed.

The menu 1304 can, for example, display and enable selection of application programs to execute (e.g. email, calendar or word processing software), execute actions within a currently used program (e.g. undo, redo, cut, copy or paste), change the type of interaction with the user interface by changing the type, functionality or size of the multi-touch pointer (e.g. change the multi-touch pointer to one specifically used to rotate, re-size or move an object), or select a specific interaction tool (such as paintbrush of a certain size or type in a drawing application). In a further example, the menu 1304 can enable the user to manually select a mode of operation of a multi-touch mouse. For example, the menu 1304 can present an option for user to select whether the overall cursor position in the user interface is controlled by the sensor in the base portion or by the sensors tracking the user's fingers. This can enable the user to select to use the high precision of the finger for fine-grain control of the cursor, for example when using a drawing application.

Figure 14:
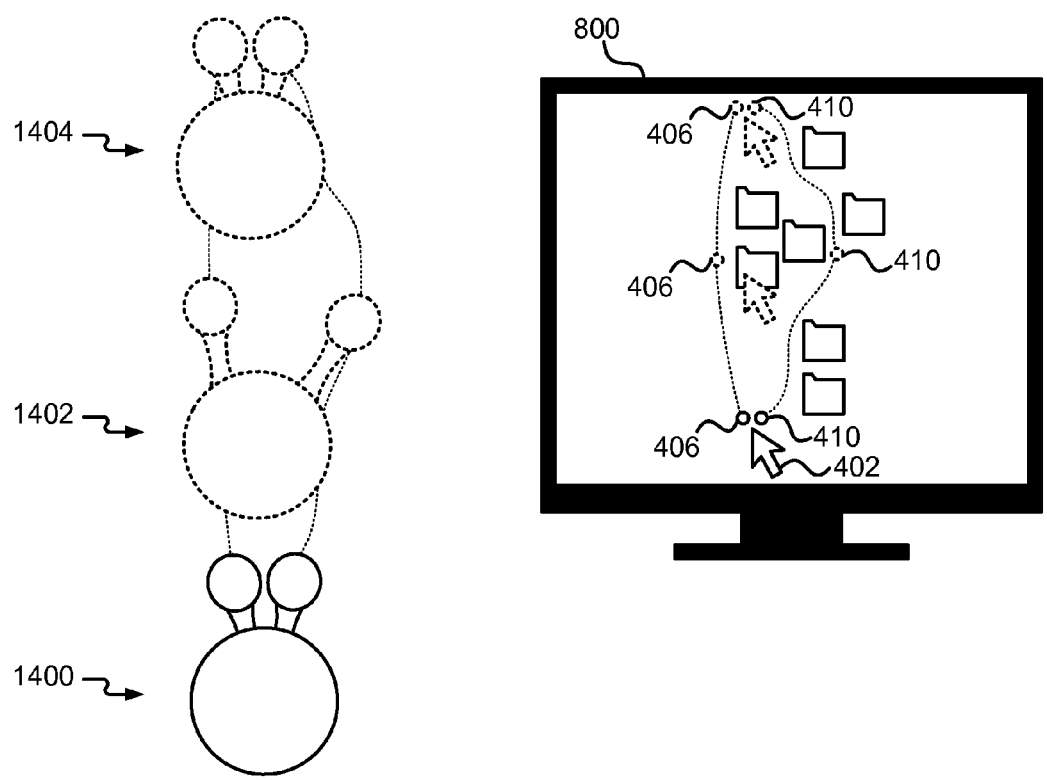
FIG. 14 illustrates a dynamic selection gesture using a multi-touch pointer.

FIG. 14 illustrates a further alternative action that can be performed using the multi-touch pointer. In the example of FIG. 14, movement of the cursor 402 is combined with movement of the representations 406 and 410 to enable flexible and dynamic selection of objects displayed in the user interface. Traditional mouse-based interactions enable the selection of objects (such as files and folders) by drawing a box around the objects by defining the location of two opposing corners of the box using the cursor. However, groups of objects cannot be selected in this way if they are not oriented such that they can be surrounded by a box. The example of FIG. 14 enables objects to be selected by drawing arbitrary shapes around objects by controlling the motion of both the base portion 106 and the satellite portions 108.

In the illustration shown in FIG. 14, the user moves the multi-touch mouse device from a start position 1400, through an intermediate position 1402 to an end position 1404. As the base portion 106 is moved through this motion, the satellite portions 108 are also moved in order to surround or exclude particular objects from the selection. In the user interface, as the base portion 106 is moved, both the cursor 402 and the representations 406 and 410 are moved (upward over the display device 800 in FIG. 14). By controlling the spacing between the satellite portions 108, the representations 406 and 410 surround those objects that the user wants to select as they are moved over the user interface. In other words, the user can trace out an arbitrary shape on the user interface to select certain objects, and not select others.

In preferred examples, the representations 406 and 410 draw the shape of the selection area as they are moved over the user interface, to increase the visibility of the selection to the user. In some examples, a 'net' or 'bag' can be displayed suspended between the representations 406 and 410, and into which the on-screen objects are shown to be 'caught'. Preferably, the 'bag' or 'net' can grow to reflect the number of objects that have been selected (i.e. caught in it). In addition, the 'bag' or 'net' can be arranged to show previews or iconic representations of the types of content or object selected. Furthermore, the 'net' or 'bag' can be rendered in different colors to provide feedback on the type of selection being performed (e.g. whether something is being cut or copied). This type of arbitrary selection can also be performed in the case of a multi-touch pointer having a cursor and only a single digit representation (as in examples 400 and 500). In this case, the cursor and the single representation each trace out a side of the selection region. In addition, this type of arbitrary selection can also be used with direct-touch interaction hardware, such as touch-screens.

Once objects have been selected using the multi-touch pointer, then multi-touch gestures can be further used to enhance usability. For example, a gesture can cause the selected objects to be cut or copied. This can be achieved, for example, by the user drawing the satellite portions 108 together and inwards towards the base portion 106, so that the representations 406 and 410 move to the cursor 402 as if scooping the selected files into the cursor 402. The cursor 402 can then be moved to a new location (e.g. a new folder) with the representations 406 and 410 in this position, and the files pasted by 'releasing' them from the cursor 402 by the user moving the representations 406 and 410 away from the cursor 402.

Note that the above-described interaction techniques are merely examples of how the multi-touch pointers can be used with indirect interaction devices. As mentioned, the multi-touch mouse device used in the above is an example only.

The above-described techniques could also be used with indirect interaction hardware other than mouse-based devices. For example, the user can control a multi-touch touch-pad such that, when only a single digit is detected on the touch pad then the cursor (such as cursor 402) is moved in the user interface, but when more than one digit is detected on the touch-pad then the cursor freezes in position and the digits control the position of the representations in the touch region around the frozen cursor to enter multi-touch input.

In the above-described examples, the multi-touch input by the user can be detected automatically by analyzing the relative motion of the representations of the user's digits and the cursor. In alternative examples, the user can explicitly indicate that a multi-touch gesture is being performed, for example by activating a button, selecting a key or detecting a difference in pressure. In the case of a multi-touch mouse, for example, a button can be located on the base unit, such that the button can be activated with the user's palm 104 to indicate that multi-touch gestures are being made using the digits. Alternatively, a key can be activated on a keyboard with another hand of the user while making multi-touch gestures.

To further enhance the visualization of the multi-touch gestures, the representations of the user's digits shown in the multi-touch pointers can be arranged to leave on-screen 'trails' so that the user can readily see the path that the representations are taking. This enables the user to clearly see the type of gestures they are making without looking at the indirect interaction device.

In other examples, the multi-touch pointer itself can be arranged to animate or morph between different forms to indicate the type of input that is being received. For example, when only movement of the cursor control device is being received, then the cursor displayed in the user interface resembles a traditional arrowhead cursor. However, when movement of one or more of the user's digits is detected, then the cursor can morph into one of the forms shown in FIG. 4 to 6. This aids the user as they can clearly differentiate between the types of input that are currently being recognized in the user interface.

The use of a multi-touch pointer such as those shown in FIG. 4 to 6, controlled using indirect interaction devices such as those shown in FIG. 1 to 3, and operated in accordance with the flowchart of FIG. 7 enables the user to accurately and reliably provide multi-touch inputs and gestures, even though the user's digits are not directly interacting with the user interface. In particular, the user can visualize from the representations the relative position and movements of their digits without looking at the interaction device. The display of the representations also increases the accuracy of the multi-touch gestures as they enable the users to know how their digits are positioned before starting to make a gesture. This enables the user to tailor the movements according to the current orientation of the digits.

Furthermore, because the representations move with the cursor as the cursor is moved around in the user interface, the user knows where a multi-touch gesture is going to be applied. In other words, the user can use the cursor to accurately control which on-screen object is being manipulated using multi-touch. Because the cursor is persistent, and does not leave the user interface when the user removes their hands from the indirect interaction device, a consistency and predictability is maintained, and the user can readily understand where the control point is, even when they release the interaction device.

Figure 15:
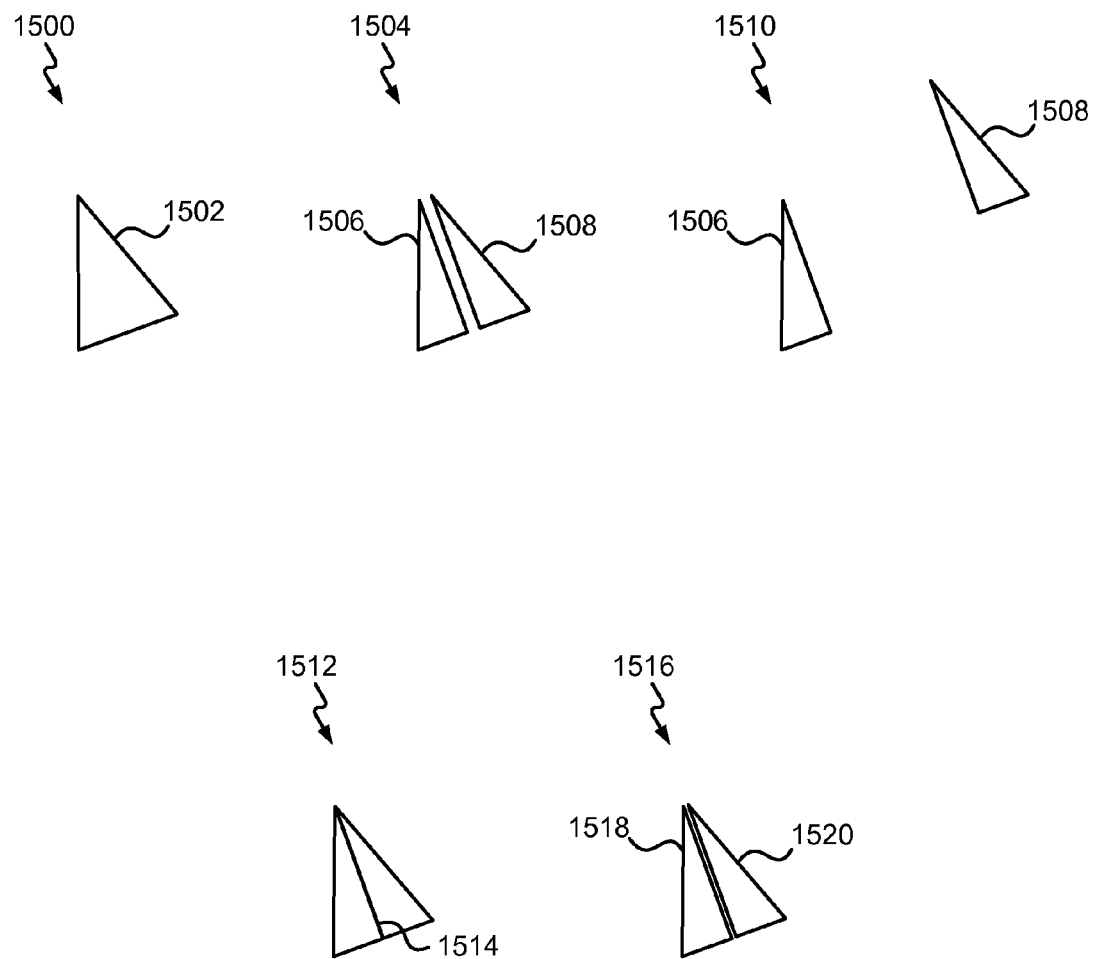
FIG. 15 illustrates a dividable cursor.

Reference is now made to FIG. 15, which illustrates an alternative example of a multi-touch pointer. The example of FIG. 15 differs from those shown in FIG. 3 to 6 in that there is not a single consistent representation of a cursor reflecting the movement of a cursor control device (such as a base portion or mouse device). Rather, the multi-touch pointer of FIG. 15 changes form from a single aggregate cursor to multiple cursors in order to enable multi-touch input. Preferably, the multi-touch pointer divides or splits into a plurality of separately controllable cursors.

FIG. 15 shows an initial, combined state 1500 for the multi-touch pointer in which it has the form of a single aggregate cursor 1502. This is known as 'single-touch mode'. The user can readily manipulate the multi-touch pointer in state 1500 in a similar manner to a traditional mouse cursor. However, when multi-touch input is desired, the multi-touch pointer is arranged to enter a divided state 1504 in which the aggregate cursor 1502 splits into two separate portions 1506 and 1508. Each of the two separate portions 1506 and 1508 can be independently controlled by the user to provide multi-touch input, and can be moved separately across the user interface, as shown in state 1510. This is known as 'multi-touch mode'. Preferably, the division of the multi-touch pointer is animated in the user interface, so that user can see what is happening to the aggregate cursor 1502.

An alternative combined state 1512 is illustrated in FIG. 15 in which the aggregate cursor is provided with a line 1514 to indicate to the user the capability of the multi-touch pointer to divide. Other examples can indicate this using a color change or gradient. Similarly, a further alternative combined state 1516 is illustrated in which the aggregate cursor already shows separate portions 1518 and 1520, but with only a small separation between the portions to indicate the capability to be divided further. In other words, the aggregate cursor is formed of two triangles displayed side-by-side, and, when divided, each separate portion is formed of one of the triangles.

The illustrative examples of FIG. 15 show the multi-touch pointer as a triangle shape both before and after division. However, any suitable cursor shapes can be used. In addition, the multi-touch pointer can be arranged to animate or morph between states, enabling non-tessellating shapes to be used for the cursors. For example, the combined state can be an arrowhead shape, and the multi-touch pointer can morph into separate circle shapes when appropriate.

A multi-touch pointer such as that shown in FIG. 15 can be controlled by any of the indirect interaction devices outlined above with reference to FIG. 1 to 3. In addition, as the multi-touch pointer of FIG. 15 does not require the persistent position of a base portion or mouse device to provide the location of a cursor when providing multi-touch input, the multi-touch pointer of FIG. 15 is suited to use with multi-touch capable touch-pads.

Figure 16:
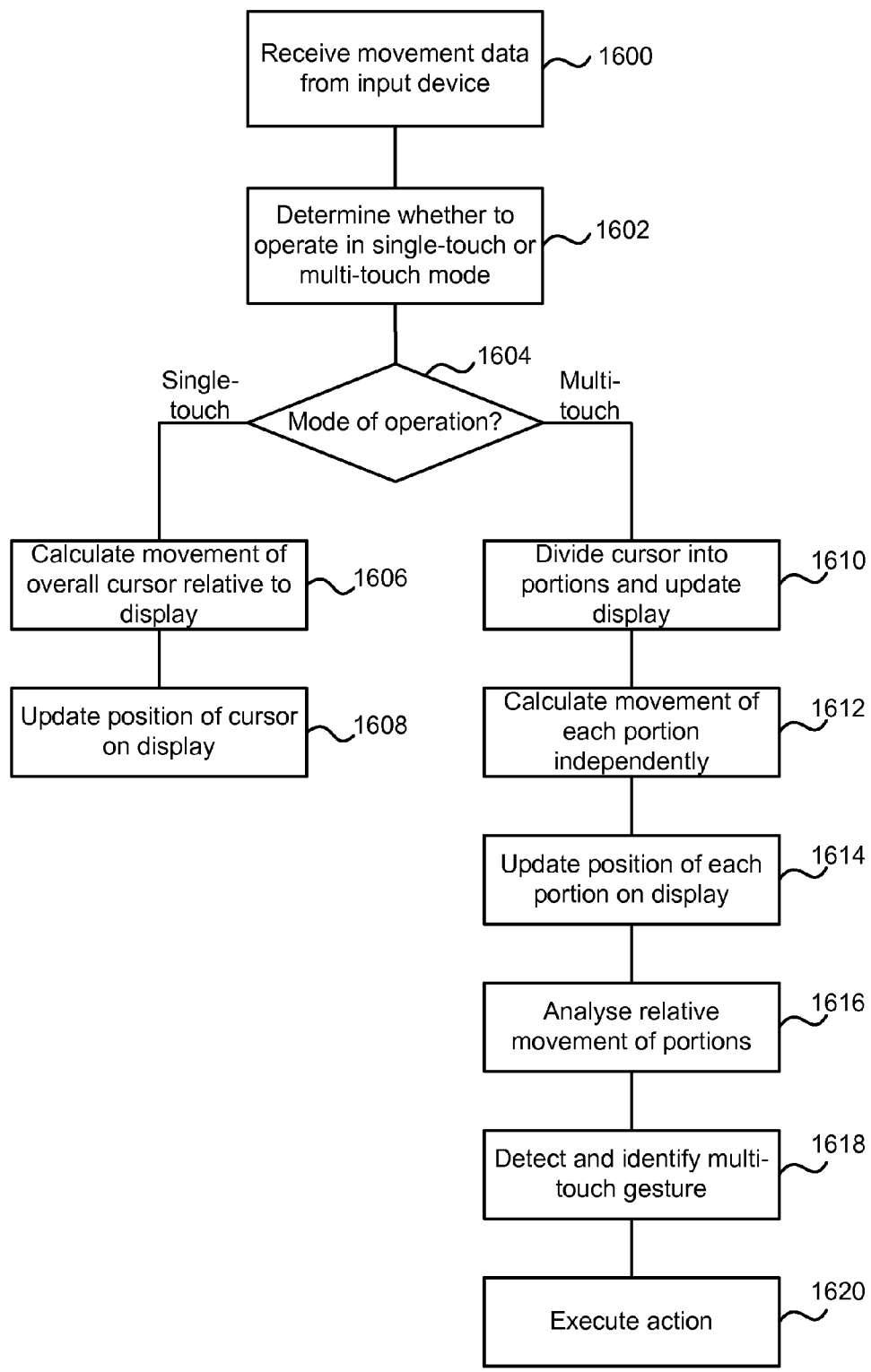
FIG. 16 illustrates a flow chart for controlling a user interface using a dividable cursor.

Reference is now made to FIG. 16, which illustrates a flowchart of a process for controlling a multi-touch pointer such as that shown in FIG. 15. Firstly, data is received 1600 from the indirect interaction device (or devices) that indicates position and/or movement data of the user's hand and digits. For example, in the case of a multi-touch mouse device, the movement of the base portion indicates the movement of the user's hand, and the movement of the satellite portions or touch-pad sensing indicates the movement of the user's digits. In the case of a multi-touch touch-pad, the data indicates the location and movement of one or more of the user's digits in contact with the touch-pad.

The data provided from the indirect interaction device is analyzed to determine 1602 whether to operate the multi-touch pointer in single touch mode or multi-touch mode. For example, if the data from a multi-touch mouse device indicates that the base portion is moving, but the digits are remaining substantially stationary relative to the base portion, then this indicates that the device is being operated in single touch mode. Similarly, if data from a multi-touch touch-pad indicates that only a single digit is in contact with the touch-pad (or multiple digits are close together), then this indicates that the device is being operated in single touch mode. Conversely, if data from a multi-touch mouse device indicates that the digits are moving relative to the base portion, then this indicates that the device is being operated in multi-touch mode. Likewise, if data from a multi-touch touch-pad indicates that a plurality of digits are in contact with the touch-pad and separated from each other, then this indicates that the device is being operated in multi-touch mode.

In an alternative example, the user can explicitly select the mode in which to operate. For example, the user can select to operate in multi-touch mode by sending a control signal to the user terminal by activating a button on the interaction device or selecting a key.

If it is determined 1604 that the device is operating in single-touch mode, then the movement of the aggregate cursor 1502 in the user interface is calculated 1606 in a similar manner to traditional mouse cursors, and the user interface is updated 1608 to show the movement of the aggregate cursor 1502.

However, if it is determined 1604 that the device is operating in multi-touch mode, then the aggregate cursor 1502 is divided into separate portions 1506 and 1508. The movement of each of the separate portions 1506 and 1508 is calculated 1612 independently and separately in accordance with the multi-touch input. For example, each separate portion is assigned to an individual digit sensed on a multi-touch touch-pad or to an individual satellite portion. The data from each individual digit or satellite portion is then used to control the movement of the associated separate portion of the multi-touch pointer. The user interface is updated 1614 to reflect the movement of the separate portions 1506 and 1508.

The calculated movement of the separate portions 1506 and 1508 relative to each other are analyzed 1616. The relative movement analysis is used to detect and identify 1618 a multi-touch gesture. Responsive to detecting a particular multi-touch gesture, a corresponding action is executed 1620 by the processor. For example, a particular detected gesture can be mapped to a user interface control, such that parameters derived from the gesture (e.g. the size or angle of the gesture) are translated to corresponding software controls. The user interface control is provided to a software program in order to control the display on the user interface, for example to manipulate an on-screen object. In an alternative example, if the gesture is mapped to the execution of a software program, the actuation of a function or a selection from a menu, then an appropriate command is created. The control input derived from the gesture can control either the operating system or an application executed on the operating system.

The types of multi-touch gestures that can be detected comprise the rotation, scaling, selection and execution gestures, for example as outlined above with reference to FIG. 9 to 14.

Figure 17:
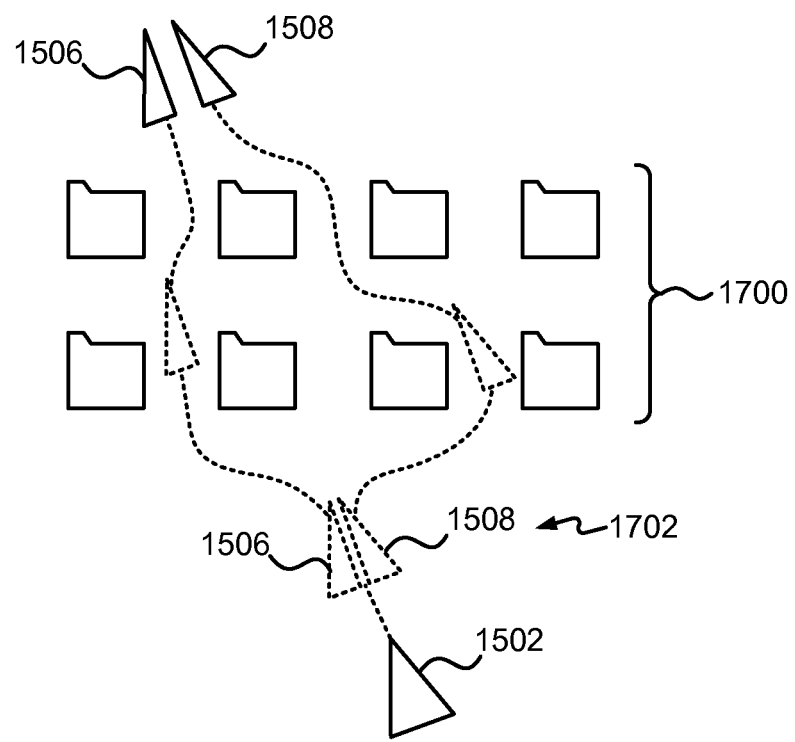
FIG. 17 illustrates an example selection technique using a dividable cursor.

FIG. 17 shows an example of the multi-touch selection operation, where the user is utilizing the multi-touch pointer to select certain on-screen objects from a plurality of objects 1700. The multi-touch pointer is initially an aggregate cursor 1502, and at point 1702 the user triggers the splitting of the aggregate cursor 1502 (for example by moving their digits apart) and the multi-touch pointer enters multi-touch mode. The aggregate cursor 1502 splits into separate portions 1506 and 1508, which can be independently moved in the user interface to surround the desired on-screen objects. Once the objects have been selected, the separate portions 1506 and 1508 can be brought back together to re-form the aggregate cursor.

As described above with reference to FIG. 14, in preferred examples, the separate portions 1506 and 1508 draw the shape of the selection area as they are moved over the user interface, to increase the visibility of the selection to the user. In some examples, a 'net' or 'bag' can be displayed suspended between the separate portions 1506 and 1508, and into which the on-screen objects are shown to be 'caught'. The independently movable nature of the separate portions 1506 and 1508 enables arbitrary selections of on-screen objects, and can be combined with further multi-touch gestures, e.g. for copy and paste as described above with reference to FIG. 14.

Figure 18:
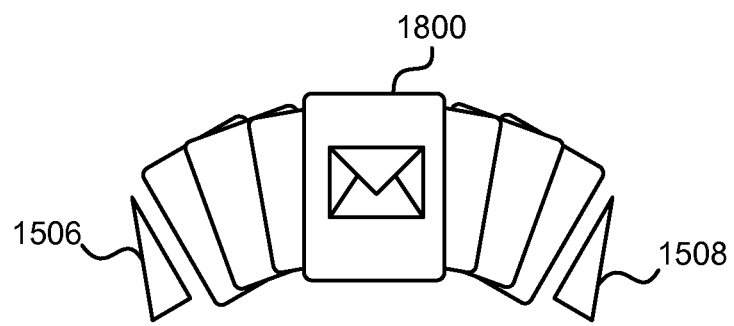
FIG. 18 illustrates an example menu display using a dividable cursor.

FIG. 18 illustrates an example of a menu selection operation using the multi-touch pointer. In this example, the aggregate cursor 1502 divides into the separate portions 1506 and 1508 to reveal a menu (similar to that described with reference to FIG. 13) presented in the space between the separate portions.

The use of a dividing multi-touch pointer such as that shown in FIG. 15, controlled using indirect interaction devices such as those shown in FIG. 1 to 3, and operated in accordance with the flowchart of FIG. 16 enables the user to accurately and reliably provide multi-touch inputs and gestures, even though the user's digits are not directly interacting with the user interface. The user can readily see from whether the multi-touch pointer has been divided or not whether multi-touch inputs are currently being entered. When the multi-touch mode has been entered, the user can visualize from the separate portions 1506 and 1508 the relative position and movements of their digits without looking at the interaction device.

A cursor is maintained at all times on the display, which aids the user as they do not lose their control position in the user interface. In other words, the multi-touch pointer changes shape according to the mode it is in, but never completely disappears from the user interface. Because the multi-touch pointer is persistent, a consistency and predictability is maintained, and the user can readily understand where the control point is.

Figure 19:
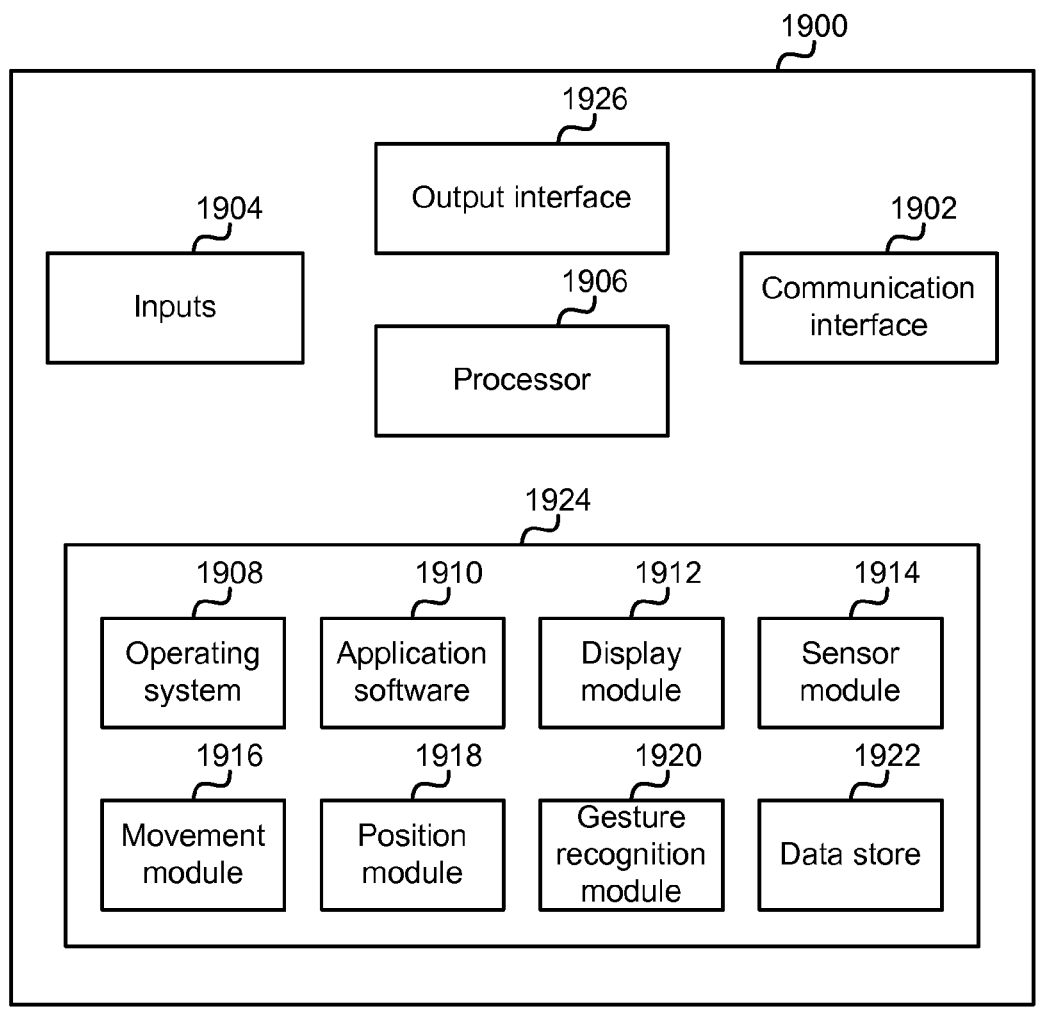
FIG. 19 illustrates an exemplary computing-based device in which embodiments of the indirect multi-touch interaction can be implemented.

FIG. 19 illustrates various components of an exemplary computing-based device 1900 which can be implemented as any form of a computing and/or electronic device, and in which embodiments of the techniques for using the indirection multi-touch interaction described herein can be implemented.

The computing-based device 1900 comprises a communication interface 1902, which is arranged to communicate with at least one indirect interaction device. The computing-based device 1900 can also comprise one or more further inputs 1904 which are of any suitable type for receiving media content, Internet Protocol (IP) input or other data.

Computing-based device 1900 also comprises one or more processors 1906 which can be microprocessors, controllers or any other suitable type of processors for processing executable instructions to control the operation of the device in order to perform the techniques described herein. Platform software comprising an operating system 1908 or any other suitable platform software can be provided at the computing-based device to enable application software 1910 to be executed on the device. Other software functions can comprise one or more of:

- A display module 1912 arranged to control the display device 800, including for example the display of a multi-touch pointer in a user interface;
- A sensor module 1914 arranged to read data from the at least one indirect interaction device describing the sensed location and movement of one or more of the user's hands and digits;
- A movement module 1916 arranged to determine the movement of one or more of the user's hands and digits from the sensed data;
- A position module 1918 arranged to read sensor data and determine the position of one or more of the user's hands and digits from the sensed data;
- A gesture recognition module 1920 arranged to analyze the position data and/or the movement data and detect user gestures; and
- A data store 1922 arranged to store sensor data, images, analyzed data etc.

The computer executable instructions can be provided using any computer-readable media, such as memory 1924. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

An output interface 1926 is also provided such as an audio and/or video output to a display device 800 integral with or in communication with the computing-based device 1900. The display device 800 can provide a graphical user interface, or other user interface of any suitable type.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of controlling a user interface displayed on a display device, comprising:
   receiving a first data sequence describing movement of a cursor control device relative to a non-display surface, the cursor control device being separate from the display device and operable by a user;
   receiving a second data sequence describing movement of a digit of the user;
   receiving an indication of a selection of a fixed mode or a relative mode;
   displaying in the user interface a cursor and a touch region comprising a representation of the digit of the user;

processing the first data sequence such that, when the fixed mode is selected, movement of the cursor control device moves the cursor independent of the touch region in the user interface and, when the relative mode is selected, movement of the cursor control device moves the cursor and the touch region in the user interface, whilst maintaining the location of the touch region relative to the cursor; and processing the second data sequence such that movement of the digit by the user moves the representation of the digit in the touch region.

2. A method according to claim 1, further comprising the step of: analyzing the movement of the representation of the digit relative to the cursor to detect a user gesture.

3. A method according to claim 2, further comprising the step of:

responsive to detecting the user gesture, selecting an action in dependence on the user gesture and executing the action.

4. A method according to claim 3, further comprising the step of: applying the action to an object selected in the user interface by the cursor.

5. A method according to claim 3, wherein the action comprises at least one of: rotating an object; scaling an object; selecting at least one object; and displaying a menu.

6. A method according to claim 1, wherein the second data sequence further describes movement of at least one further digit of the user, the touch region further comprises a representation of the or each further digit, and the method further comprises the step of processing the second data sequence such that movement of the further digit by the user moves the respective representation in the touch region relative to the cursor and other representations in the touch region.

7. A method according to claim 6, further comprising the step of: analyzing the relative movement of each representation in the touch region to detect a user gesture.

8. A method according to claim 1, wherein the cursor control device is a multi-touch, non-virtual mouse device arranged to sense movement of a base portion of the multi-touch, non-virtual mouse device over a supporting surface and sense movement of one or more digits of the user of the multi-touch, non-virtual mouse device relative to the base portion, and wherein the first data sequence describes the movement of the base portion, and the second data sequence describes movement of the digit of the user relative to the base portion.

9. A method according to claim 1, wherein the cursor control device is a physical mouse device, and the first data sequence describes the movement of the physical mouse device over a supporting surface.

10. A method according to claim 1, wherein the cursor control device is a touch pad, and the first data sequence describes the movement of a contact point of the user on the touch pad.

11. A method according to claim 1, wherein the second data sequence is provided by a touch pad arranged to sense movement of at least one digit of the user over the touch pad.

12. A method according to claim 1, wherein the representation is displayed in proximity to a control point of the cursor.

13. A method according to claim 1, wherein the touch region surrounds a control point of the cursor.

14. A computer-implemented method of controlling a user interface displayed on a display device, comprising:

receiving data from at least one pointing device, the data describing movement of a plurality digits of a user; and switching operation of the user interface from a first mode of operation in which the data is used to control movement of an aggregate cursor displayed in the user interface to a second mode of operation in which the aggregate cursor is divided into a plurality of separate portions and the data is used to control movement of each portion independently, switching between the first and second mode based at least in part on a multi-touch input mode being available to the user.

15. A method according to claim 14, wherein switching between the first and second mode comprises changing at least one color of at least one portion of the aggregate cursor.

16. A method according to claim 14, wherein switching between the first and second mode comprises analyzing the relative movement of the plurality of digits to determine an appropriate mode of operation.

17. A method according to claim 14, wherein switching between the first and second mode comprises receiving and processing a control signal from the user indicating a selected mode of operation.

18. A method according to claim 14, wherein the pointing device is at least one of: a multi-touch touch pad; and a multi-touch mouse device.

19. A method according to claim 14, further comprising the steps of:

analyzing the movement of portions relative to each other to detect a user gesture;

responsive to detecting the user gesture, selecting an action in dependence on the user gesture; and executing the action.

20. A computer system, comprising:

a display device;

a communication interface arranged to receive a first and second data sequence from a multi-touch mouse device operable by a user, the first data sequence describing movement of a base portion of the multi-touch mouse device, and the second data sequence describing movement of a plurality of digits of the user of the multi-touch mouse device relative to the base portion; and a processor arranged to display a user interface on the display device, display in the user interface a cursor and a touch region comprising a representation for each of the digits of the user, process the first data sequence such that movement of the base portion moves the cursor and the touch region in the user interface, whilst maintaining the location of the touch region relative to the cursor, and process the second data sequence such that movement of one of the digits moves the respective representation in the touch region relative to the cursor, movement of the respective representation of the digit comprising leaving a trail on the display device indicating at least a portion of the movement of the respective representation.

* * * * *